US009252976B2

(12) United States Patent
Olsen et al.

(10) Patent No.: US 9,252,976 B2
(45) Date of Patent: Feb. 2, 2016

(54) METHOD AND SYSTEM FOR SOCIAL MEDIA COOPERATION PROTOCOL

(71) Applicant: SALESFORCE.COM, INC., San Francisco, CA (US)

(72) Inventors: Joseph M. Olsen, Mountain House, CA (US); Zachary James Dunn, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 369 days.

(21) Appl. No.: 13/714,384

(22) Filed: Dec. 13, 2012

(65) Prior Publication Data

US 2013/0304830 A1 Nov. 14, 2013

Related U.S. Application Data

(63) Continuation of application No. 13/692,962, filed on Dec. 3, 2012, now Pat. No. 9,094,359.

(60) Provisional application No. 61/644,530, filed on May 9, 2012, provisional application No. 61/644,531, filed on May 9, 2012.

(51) Int. Cl.
*H04L 12/58* (2006.01)
*G06Q 50/00* (2012.01)
*H04L 29/08* (2006.01)

(52) U.S. Cl.
CPC .............. *H04L 12/581* (2013.01); *G06Q 50/01* (2013.01); *H04L 51/066* (2013.01); *H04L 51/16* (2013.01); *H04L 51/32* (2013.01); *H04L 67/10* (2013.01)

(58) Field of Classification Search
CPC ....... H04L 51/24; H04L 51/32; H04L 51/066; H04L 51/16; H04L 67/10; G06Q 50/01
USPC .......................................................... 709/206
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |

(Continued)

OTHER PUBLICATIONS

U.S. Final Office Action dated Sep. 11, 2014 issued in U.S. Appl. No. 13/692,962.

(Continued)

*Primary Examiner* — Kristie Shingles
(74) *Attorney, Agent, or Firm* — Weaver Austin Villeneuve & Sampson LLP

(57) ABSTRACT

Methods and systems for social media cooperation, via allowing inter-social network communications between users of different networks is provided. The inter-social network communications may be facilitated by sending inter-social network communications in a format determined by a protocol that is used by the social networks agreeing to allow inter-social network communications.

18 Claims, 19 Drawing Sheets

(56) References Cited

U.S. PATENT DOCUMENTS

| | | |
|---|---|---|
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et at. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshaysky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zuckerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,412,770 B2 | 4/2013 | Marcucci et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,595,146 B1 * | 11/2013 | Liew ............... 705/319 |
| 8,646,103 B2 | 2/2014 | Jakobson et al. |
| 8,843,573 B2 * | 9/2014 | Cuervo ............ 709/206 |
| 8,856,248 B2 * | 10/2014 | Chen et al. ....... 709/206 |
| 8,874,665 B2 * | 10/2014 | Peterson et al. ..... 709/206 |
| 8,886,766 B2 | 11/2014 | Dunn et al. |
| 8,984,051 B2 | 3/2015 | Olsen et al. |
| 9,058,363 B2 | 6/2015 | Dunn et al. |
| 9,094,359 B2 | 7/2015 | Olsen et al. |
| 9,123,080 B2 * | 9/2015 | Terleski ............ G06Q 50/01 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |

(56) References Cited

U.S. PATENT DOCUMENTS

| | | |
|---|---|---|
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0196922 A1 | 8/2011 | Marcucci et al. |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0102114 A1 | 4/2012 | Dunn et al. |
| 2012/0223951 A1 | 9/2012 | Dunn et al. |
| 2012/0233137 A1 | 9/2012 | Jakobson et al. |
| 2012/0290407 A1 | 11/2012 | Hubbard et al. |
| 2012/0331053 A1 | 12/2012 | Dunn |
| 2013/0007148 A1 | 1/2013 | Olsen |
| 2013/0021370 A1 | 1/2013 | Dunn et al. |
| 2013/0024454 A1 | 1/2013 | Dunn |
| 2013/0024511 A1 | 1/2013 | Dunn et al. |
| 2013/0024788 A1 | 1/2013 | Olsen et al. |
| 2013/0031172 A1 | 1/2013 | Olsen et al. |
| 2013/0060859 A1 | 3/2013 | Olsen et al. |
| 2013/0061156 A1 | 3/2013 | Olsen et al. |
| 2013/0091149 A1 | 4/2013 | Dunn et al. |
| 2013/0091229 A1 | 4/2013 | Dunn et al. |
| 2013/0198652 A1 | 8/2013 | Dunn et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2013/0304829 A1 | 11/2013 | Olsen et al. |
| 2014/0359537 A1 | 12/2014 | Jackobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |

OTHER PUBLICATIONS

U.S. Notice of Allowance dated Jan. 7, 2015 issued in U.S. Appl. No. 13/692,962.

U.S. Notice of Allowance dated Mar. 17, 2015 issued in U.S. Appl. No. 13/692,962.

"Google Plus Users", Google+Ripples, Oct. 31, 2011 [retrieved on Feb. 21, 2012 from Internet at http://www.googleplusers.com/google-ripples.html], 3 pages.

* cited by examiner

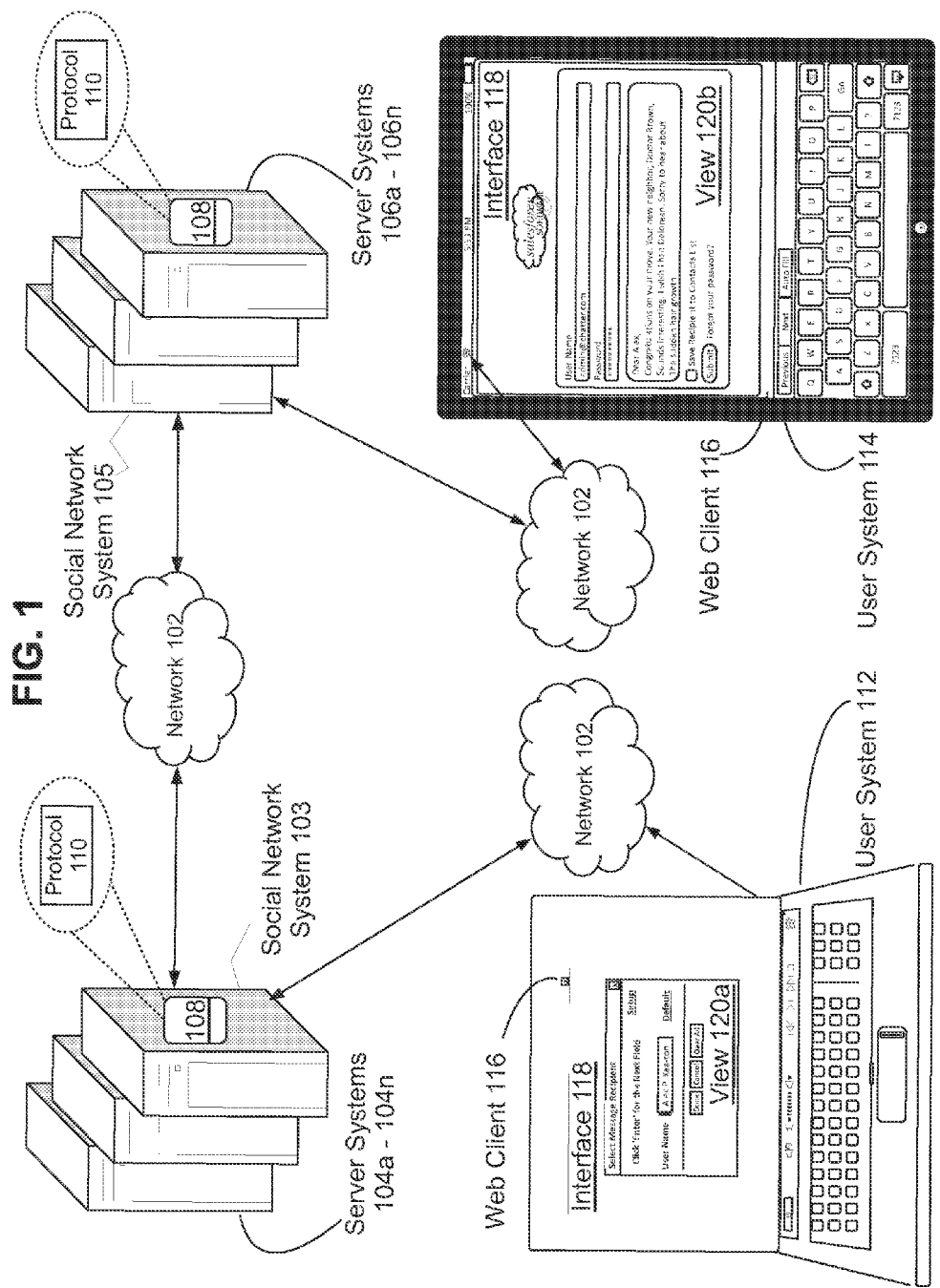

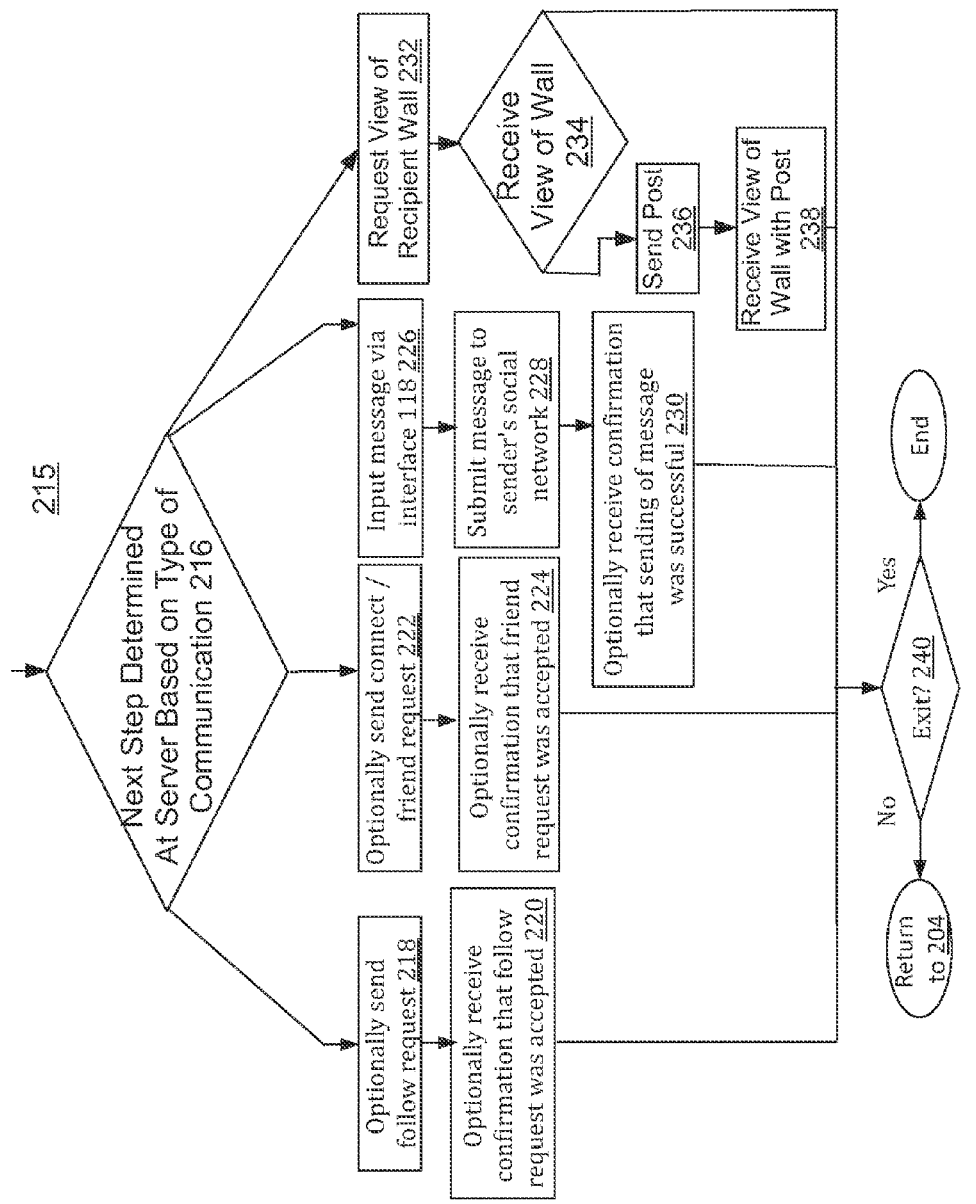

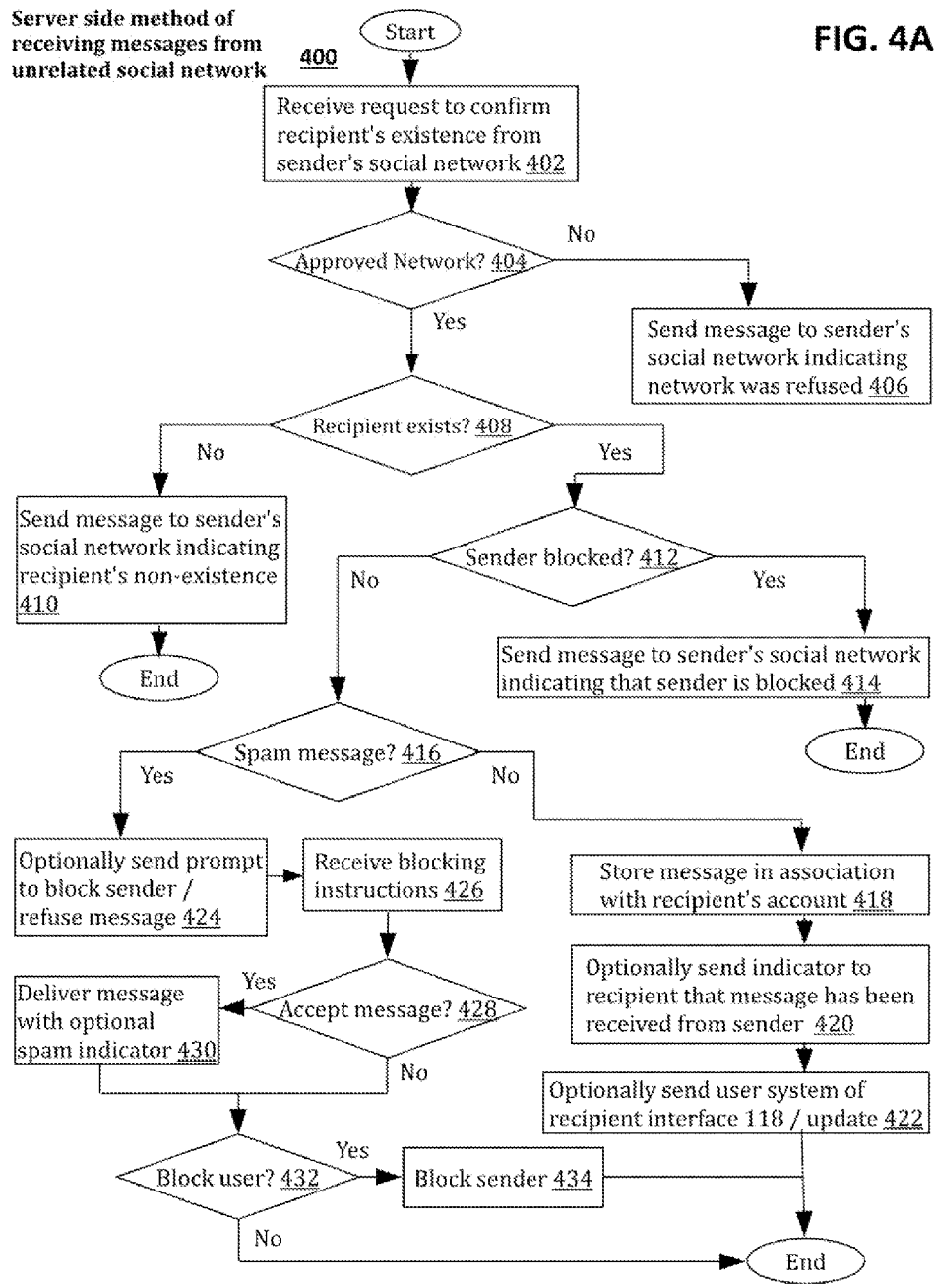

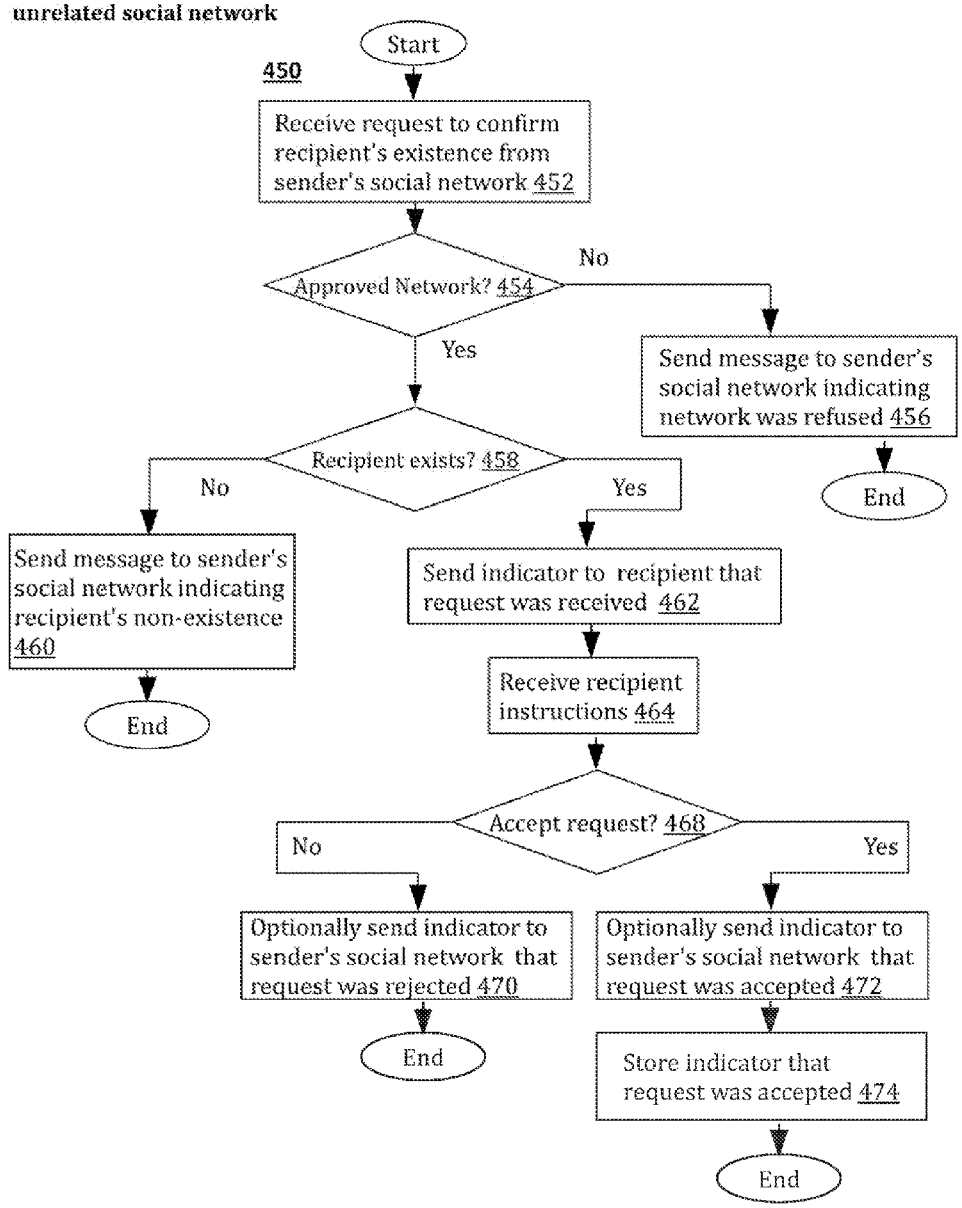

METHOD AND SYSTEM FOR SOCIAL MEDIA COOPERATION PROTOCOL

CLAIM OF PRIORITY

The following commonly owned, co-pending U.S. patents and patent applications, including the present application, are related to each other. Each of the other patents/applications are incorporated by reference herein in its entirety:
U.S. patent application Ser. No. 13/714,384, entitled METHOD AND SYSTEM FOR SOCIAL MEDIA COOPERATION PROTOCOL, by Joseph M. Olsen et al., filed Dec. 13, 2012; and The following commonly owned, co-pending U.S. patents and patent applications, including the present application, are related to each other. Each of the other patents/applications are incorporated by reference herein in its entirety:
U.S. patent application Ser. No. 13/692,962 entitled METHOD AND SYSTEM FOR SOCIAL MEDIA COOPERATION PROTOCOL, by Joseph M. Olsen et al., filed Dec. 3, 2012.

CROSS REFERENCE TO RELATED APPLICATIONS

This application is a continuation of U.S. patent application Ser. No. 13/692,962 entitled METHOD AND SYSTEM FOR SOCIAL MEDIA COOPERATION PROTOCOL, by Joseph M. Olsen et al., filed Dec. 3, 2012, which in turn claims the benefit of U.S. Provisional Patent Application 61/644,530 entitled METHOD AND SYSTEM FOR SOCIAL MEDIA COOPERATION PROTOCOL, by Olsen, et al., filed May 9, 2012, and U.S. Provisional Patent Application 61/644,531 entitled METHOD AND SYSTEM FOR SOCIAL MEDIA COOPERATION PROTOCOL, by Olsen, et al., filed May 9, 2012; this application separately claims the benefit of U.S. Provisional Patent Application 61/644,530 entitled METHOD AND SYSTEM FOR SOCIAL MEDIA COOPERATION PROTOCOL, by Olsen, et al., filed May 9, 2012, and U.S. Provisional Patent Application 61/644,531 entitled METHOD AND SYSTEM FOR SOCIAL MEDIA COOPERATION PROTOCOL, by Olsen, et al., filed May 9, 2012, and the entire contents of each of the above applications are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to methods and systems for communications between social media.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which, in and of themselves, may also be inventions.

Social networking and business networking influence the way people communicate. Because of the influence of social media on the way people communicate, there are many social networks being developed and used by users throughout the world. For example, Facebook®, MySpace®, Linkedin®, Google+®, Twitter®, Chatter®, and other social networks have been created and developed in response to the social media craze.

BRIEF DESCRIPTION OF THE DRAWINGS

In the following drawings like reference numbers are used to refer to like elements. Although the following figures depict various examples of the invention, the invention is not limited to the examples depicted in the figures.

FIG. 1 illustrates a block diagram of an embodiment of a system for social media cooperation, by for example, allowing inter-social network communications.

FIGS. 2A and 2B illustrate a flow diagram of an embodiment of a client side method of sending messages, via a first social network, to a second social network that is unrelated to the first social network.

FIG. 4A illustrates a flow diagram of an embodiment of a server side method of receiving messages from a first social network at a second social network that is unrelated to the first social network.

FIG. 4B illustrates a flow diagram of another embodiment of a server side method of receiving messages from a first social network at a second social network that is unrelated to the first social network.

DETAILED DESCRIPTION

Figure 2A:
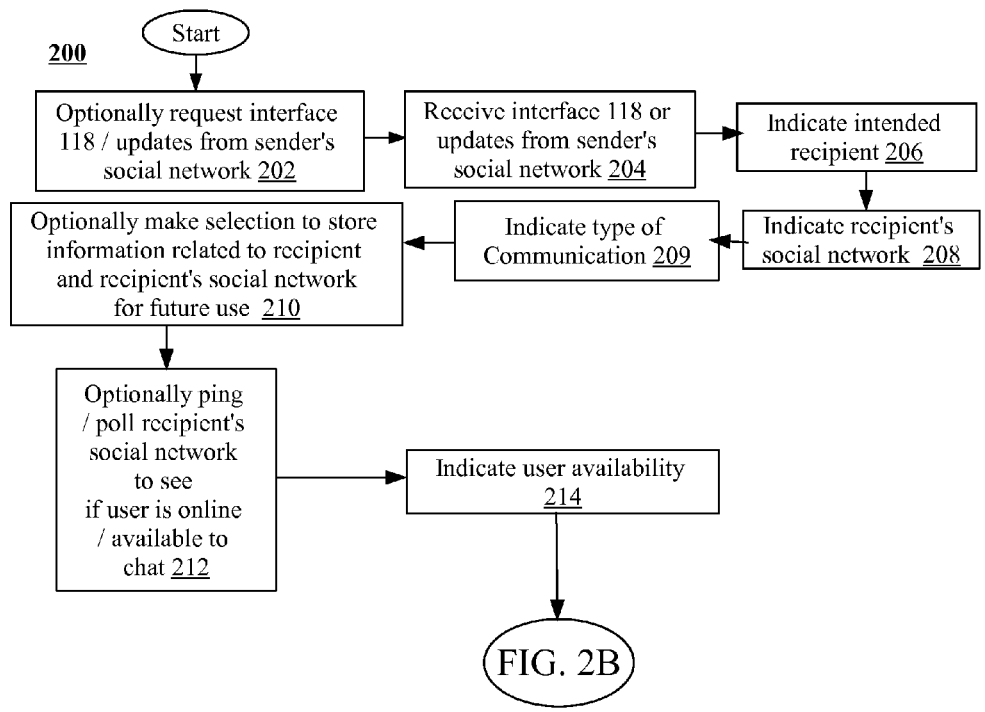

One reason why inter-social network communication may be desirable is that not every user is a member of every social network, yet. One user may want to communicate socially with another user of a different social network (e.g., a Chatter user may want to post something on a wall of a Facebook user or add something to another type of social feed of the Facebook user). Currently, there is no protocol for social networks to communicate with each other. Having a protocol for inter-social network communications facilitates inter-social-network communications between users of different networks. In this specification, systems and methods, including a protocol, are provided, that facilitate communications between social networks.

In at least one embodiment, an inter-social-network protocol may be used for cross social network domain communications (the inter-social-network protocol may also be referred to as a social media communications protocol). The protocol at one level sends messages between social network systems that interface between the social network systems. The protocol may include a message format. The message format may require that the message include information about the receiving user/entity and also information about the sending user/entity (e.g., an identifier of the user and an identifier of the social network from which the message is sent and an identifier of the user and the social network to which the message was sent). In an embodiment, when a social network receives a message, via the protocol, the social network validates the information. For example, validating the information received may include (1) checking whether the receiving user is in fact a member of the social network receiving the message, (2) checking whether the sender is blocked by the user that is designated as the receiver, (3) checking whether the sending social network is a legitimate social network and/or is part of a select group of social networks having a message sharing agreement, and/or (4) checking whether the message is spam, for example.

If the message is validated, the message may then be posted to the receiver's wall or stored in another manner where the receiver has access (the word "receiver" refers to the receiving user and/or other entity receiving the message, and the word "sender" refers to the user and/or other entity sending the message). In at least one embodiment, the message may be sent to the receiver's direct message inbox, such as in an instant message box or an inbox within a social network e-mail application. In an embodiment, the message may include an indication of the type of message the user intended to send.

One example system that may implement aspects of a social network, such as salesforce.com's Chatter, is a multitenant database system. As used herein, the term multi-tenant database system refers to a database systems having multiple tenants. The various elements of hardware and/or software of the multitenant database system may be shared by one or more tenants. For example, a given application server may simultaneously process requests for a great number of customers, and a given database table may store rows for a potentially much greater number of customers. Each tenant of the multitenant database system may pay rent, license fees, and/or other fees in exchange for usage of a portion of the database of the multitenant database system. Each tenant may be an individual user, company, or other organization. Each tenant may be an organization that includes, or is associated with, multiple users that are members of the organization, such as officers and employees, which may have a level of access to the multitenant database as a result of the organization being a tenant of the multitenant database. Each tenant may also have customers that have access to the multitenant database as a result of the organization being a tenant of the multitenant database. Each user of the tenant may have different levels or access depending on the user's role in the organization. Each tenant may have its own set of customers, which may also be individuals, company's and/or other organizations with their own set of members, which may have access and/or usage to a portion of the multitenant database as a result of being customers of the tenant. The multitenant database may be provided on demand, meaning that the multitenant database is provided as a service to the tenants so that the tenants do not need to know SQL or anything about the internal working of the database or be concerned with maintaining the database. As used herein, the term query plan refers to a set of steps used to access information in a database system.

Next, mechanisms and methods for providing inter-social-network protocols will be described with reference to example embodiments.

The following detailed description will first describe systems for inter-social-network communications in accordance with embodiments and/or embodiments in which methods for using and activating the protocols are detailed.

FIG. 1 illustrates a block diagram of an embodiment of a system for social media cooperation. FIG. 1 illustrates a block diagram of system 100 wherein the inter-social-network protocol may be used. In this specification, the terms social network communications, social network cooperation, social media cooperation, and inter-social-network communications may be substituted for one another to obtain embodiments. System 100 may include network 102, social network system 103, server systems 104a-n, social network system 105, server systems 106a-n, protocol 110, user system 112, user system 114, web client 116, interface 118, view 120a, and view 120b. In other embodiments, system 100 may not have all of the components listed and/or may have other elements instead of, or in addition to, those listed above.

Network 102 is a network that includes social networks that communicate with one another and optionally may include other users. Network 102 may be any computer network and/or wide area network, such as the Internet. Network 102 may be any combination of computer networks, wide area networks, local area networks, and/or phone networks.

Social network system 103 may be a social network having multiple users that communicate with one another, via communications that are uniquely associated with social networks, such as by posting messages on walls, sending intra-social network e-mails, establishing connections and/or friends, and following other users. In this specification, any mention of users friending one another may be substituted with users connecting with one another and any mention of users connecting with one another may be substituted with users friending one another. Social network system 103 may also allow similar communications to occur between members of social network system 103 and another social network. Server systems 104a-n may be one or more systems run by one social network, which may make up social network system 103.

Social network system 105 may also be a social network having multiple users that communicate with one another, via communications that are uniquely associated with social networks, such as posting messages on walls, sending intra-social network e-mails, establishing connections and/or friends, and following other users. Social network system 105 may also allow similar communications to occur between members of social network system 105 and another social network, such as social network system 103.

Server systems 106a-n may be one or more computer systems that make up social network system 105 and social network system 105 may run server systems 106a-n. Social network system 105 may communicate with social network system 103, via a pre-established inter-social-network protocol. Although only two social networks are shown in FIG. 1, there may be any number of social networks that use the same protocol to communicate with one another, which may include any combination of social networks willing to be involved in the methods of cooperation and/or that have inter-social-network communications. In other words, in an embodiment, social network system 103 and social network system 105 may be part of a group of social networks that allow their respective users to send messages via their social networks to users that are members of one of the other social networks of the group. Social network system 103 and social network system 105 are social networks that may communicate, using the protocol, with one another, via network 102. In at least one embodiment of the method for cooperation among the networks, a common protocol is defined so each social network may send messages, receive messages, such as requests to post messages on user's walls, exchange inter-social-network instant messages, "connect" other users, "follow" other users, and/or send update information between networks. In at least one embodiment, inter-social-network communications may involve verifying that each user is a valid user and each social network is a member of the group of social networks that agree to exchange inter-social network messages with one another and/or the users of the social networks. For example, social network system 103 and social network system 105 implement a protocol that allows for cooperation and communications between users of the different networks.

Examples of current social networks include but are not limited to, Facebook, Google+, MySpace, LinkedIn, Twitter, and Chatter. The social networks are not necessarily for just socializing, but may be set up for specialized forms of communications or special types of information, such as sharing career information sharing photographs, posting recipes, commenting on articles, etc.

In FIG. 1, a first user that is a member of a first social network using social network system 103, having server systems 104a-n and may want to communicate with a second user that is a member of a second social network system 105 using one or server systems 106a-n (which may be different than server systems 104a-n). The methods of this specification allow the first user to communicate with a second user on any social network systems, assuming the social networks subscribe to social media cooperation protocol.

Protocol 110 may be a protocol for implementing methods of sharing inter-social network communications between users of different social networks. The protocol 110 may be associated with an algorithm and a method to allow for cooperation between social networks, via inter-social-network communications. In particular, the protocol allows networks having the protocol to communicate with one another even if the two social networks are completely different from one another and have completely different Application Protocol Interfaces (APIs). In one embodiment, the protocol may be an XML-defined protocol with header information that allows social networks to define security, access terms, access controls, and other such features. The protocol could also be defined using a different markup language. Protocol 110 may also be implemented at a more basic level, e.g., at the bit and byte level. Protocol 110 is discussed further in conjunction with FIGS. 7 and 8, below.

User system 112 is a computing device of a first user. User system 112 may be a computer system, a mobile phone system, or other system that is capable of communicating, via network 102, with social network system 103. User system 112 allows a first user, via a first social network, to send a message, via a second social network, to a second user system.

User system 114 is a computing device operated by a second user. Similar to user system 112, user system 114 may also be a computer system, a mobile phone system, or other system that is capable of communicating, via network 102, with social network system 105 (having server systems 106a-n). User system 114 allows a second user, via a second social network systems 116a-n, to receive a message sent by a first user system 112 from a first social network system 114a-n. In the discussion that follows the user system 112 plays the role of the sender and user system 114 plays the role of the receiver. However, either of user system 112 and user system 114 may play the role or sender or receiver.

As an example, the first user might connect to Chatter and decide to send a message and/or link to a second user that is not a member of Chatter, but instead is a member of Facebook or some other social network. In at least one embodiment, the users on both ends have to approve the request to send and/or receive a message from another social network. The approval by the sender may simply involve approving the first user's sent request or message. In at least one embodiment, a user on a different social network may be followed. In one implementation, the user on a different social network may be followed without the agreement of the user being followed. User systems are discussed further in conjunction with FIGS. 11 and 12.

Web client 116 may be a browser or HTTP client or another application using a different protocol for communicating via network 102. User systems 112 and 114, using web client 116, communicate, via network 102, with servers connected to network 102. User systems 112 and 114 may use web client 116 to communicate with social network system 103 (having server systems 104a-n) and social network system 105 (having server systems 106a-n). Optionally, web client 116 may include a patch, plug-in, and/or add-on, which may be related to protocol 110, that facilitates communications with social network system 103 and/or social network system 105 and/or for sending inter-social-network communications. User systems 112 and 114 need not have the same web client 116.

Interface 118 is the user interface for interacting with social network system 103 and social network system 105. Different social network systems may have different interfaces. For example, a social network, such as Chatter, may have its own interface, which may include multiple web pages. A social network, such as "Facebook", may have another interface associated with Facebook, which may include another set of web pages. In an embodiment, the interface 118 may include one or more web pages having one or more tools, fields, and/or links related to sending an inter-social-network communication. For example interface 118 may include features for sending electronic mail to a user of another social network, posting a message to (or on the wall of) a user of another social network, friending a user of another social network, connecting to a user of another social network, and/or following a user of another social network.

Views 120a and 120b are the interactive web pages that are part of interface 118. View 120a and 120b may be different web pages that are part of different interfaces, which may be for accomplishing the same thing. For example, view 120a may be a first webpage of a first interface for sending a message to another user, and view 120b may be a second webpage of a different interface that is also for sending messages. However, cooperating social networks may each have a particular set of commands and/or boxes that may be used to communicate with other social networks via the methods discussed herein.

EXAMPLE 1

In at least one embodiment, tools and mechanisms are provided for viewing data from one social network on another social network. In other words, people may invite, and be friends with, users of other social networks. By allowing users of different social networks to communicate within one another (via a mutually agreed upon protocol), users do not need multiple social networking accounts to connect and follow friends, acquaintances, etc. Users may create a single account that has the tools and features that the users like, and then interact with users from the other social network(s) through inter-social-network communications messages.

Example 1 provides an example of an embodiment of the social network cooperation protocol. The user, Joe (e.g., using user system 112), wants to send a message to Ted (e.g., using user system 114), but Ted is not a member of the same social network as Joe (e.g., using user system 112). For example, Joe (e.g., using user system 112) is a member of Chatter and wants to post a message to Ted's Facebook page. Further, Joe (e.g., using user system 112) is not a member of Facebook. In at least one embodiment, Joe (e.g., using user system 112) opens his Chatter account types a message in his post box and includes a designator to send the message to Ted. The designator may be any set of symbols that indicate a user or entity and a social network. For example, the designator could be something like $TEDJOE.Facebook, where "$" means it is an outbound message, "TEDJOE" is the user of the person on the other network, and "Facebook" indicates the other social network.

Once Joe (e.g., using user system 112) inputs the designator, Joe types a message and clicks send. The Chatter system processes the message, recognizes, based on the designator, that the message is an outbound message, and sends the message to Facebook as a message, via the protocol. Facebook receives the inter-social-network communications message and checks to determine the intended recipient and the sender. Assuming there are no blocks on the sender, that the receiving username is valid, etc., the message may be posted to Ted's Facebook wall, where Ted may respond to the message. In at least one embodiment, the message is designated by Facebook as an "inbound" message and any response to the message is sent back to $Joe.Chatter.

In at least one embodiment, a direct messaging feature is available to the users of the social networks using the protocol, and the message does not show up on a user's public wall. In at least one embodiment, a message may be sent directly from the normal "Post" section. In at least one embodiment, a user may customize how, when, and who may see the post. In at least one embodiment, the inter-social-network communication messages that are posted on a wall are sent in a separate feed from other messages.

In one implementation, a user from one social network can request to be a "friend" or otherwise connected to a user of another social network. Once approved, in at least one embodiment, users from outside a social network appear in the user's list of "friends" and/or "followers". Users of other social networks may be listed in a friends list or followers list with an "out-of-network", "guest", or other similar type of designation. A user from outside of a social network could simply be listed as a standard friend/follower.

When a user posts to their wall, in at least one embodiment, the post is posted to the current social network (e.g., so the friends/followers on the current social network see the post) and one or more messages are generated to the social networks associated with out-of-network friends/followers. Since basic profile information about out-of-network users is maintained, the messages may be forwarded to the out-of-network users when a post is made to a wall.

In at least one embodiment, a post with an associated set of out-of-network users is rolled up into one message that is then forwarded to the other network(s). For example, a single post listing all the Facebook friends/followers may be rolled into the same message, all the Google+ users and associated post may be rolled up into the same message, etc. Alternatively, a separate message may be sent for each user of an out-of-network system.

In at least one embodiment, aliasing entities may be used to send an inter-social-network communications message to multiple feeds simultaneously. By using aliases, users may register at a central repository with one alias name that forwards all inter-social-network communications messages to all their feeds. For example, Joe registers at a central registry as Joe.Registry and associates all his social network usernames with the Registry (e.g., JoeOlsen.Chatter, JoeOlsen.Facebook, JoeOlsen.Google+, etc.). Then, if a user wants to contact Joe via all his social media accounts, merely sends an inter-social-network communications message to joe.registry.

Method Implemented by the Machine of the Sender

FIGS. 2A and 2B illustrate a flow diagram of an embodiment of a client side method 200 of sending messages to unrelated social networks (FIG. 2B is the continuation of FIG. 2A). In an embodiment, method 200 may be used with system 100 (FIG. 1). The client may be a user that wants to send a message or a client may be a recipient of the message sent.

Starting with FIG. 2A, as part of method 200, in optional step 202, user system 112 or 114 requests updates to interface 118. For example, requesting updates may include the user clicking on a user interface control (e.g., a box) or web page associated with the social network that allows the user to send a message via protocol 110. The request for updates may also include the client's act of choosing an option that is available on the web page to send to or receive a message from another social network. In this specification, the choosing of an option is considered within the scope of the requesting an update to the interface, because in order to fulfill the request the server needs to send a dialog box, another webpage, and/or a modified version of the same webpage in response, which are all forms of updates to the webpage (which may include more features related to the option).

In step 204, user system 112 (the sender) receives update(s) from sender's social network, social network system 103. By way of example, receiving the update may include, after choosing an option or a web page, a form may be presented to the client for sending a message. The form may be a special webpage or a special section of a webpage. Optionally, there may be a simple option on the social network webpage that allows a user to send one of its standard messages to a user of another social network, via an inter-social-network communication. The user may be given an elaborate interface that allows the user to do a variety of actions or the user may be given a simple choice to post to one or more additional social networks, and, more specifically, to users of the one or more additional social networks.

In step 206, user system 112 or 114 sends an indication of one or more intended recipients ("recipient") to social network system 103 or 160a-n. For example, the user, via interface 118 on user system 112 or 114, may indicate the intended recipient. As part of the protocol message format, a message may include a section indicating the intended recipient. The user may indicate an intended recipient and/or an intended recipient's social network(s). In one implementation, the user makes the indication by filling in a field with the user name, social network name, or alias of the recipient. In at least one embodiment, this may include an intended recipient at any social network that is different from the sender's social network. The information entered by the user may then be sent from user system 112 or 114 to social networks system 104*a-n* or 106*a-n*.

In step 208, user system 112 or 114 sends an indication of the recipient's social network. For example, as part of the protocol message format, there may be an indication of the social network at which the recipient is a member. The user may enter the recipient's social network in a field provided in interface 118 or select the social network from a pull down menu in interface 118 listing several social networks. In at least one embodiment, if the social network is not a member of a particular group of social networks, the current social network identifies the social network as not a member and sends a message to the sender indicating that messages cannot be sent to the target social network. Assuming that an acceptable network is chosen, the information entered by the user as part of step 208 may then be sent from user system 112 or 114 to social networks system 104*a-n* or 106*a-n*. The indication of the recipient and the recipient's social network may be sent together to social network system 103 (having server systems 104*a-n*) or 106*a-n*.

In step 209, user system 112 indicates the type of communication, which is sent from user machine 112 to social network system 103. Step 209 may be an explicit step resulting from the user input into user system 112 or may occur implicitly as a result of the user interacting with a particular portion and/or link of the interface 118 that is dedicated to a particular type of communication. For example, interface 118 may have one page for preparing an inter-social network and/or intra social network e-mails, another page for preparing an inter-social network and/or intra social network instant message, another page for preparing an inter-social network and/or intra social network friend request, another page for preparing an inter-social network and/or intra social network follow request, and/or another page for preparing an inter-social network and/or intra social network request to view a wall. From the set of information sent from user system 112 to social network 113, social network may determine the type of communication or user system 112 may send an identifier expressly indicating the type of communication.

Steps 206-210 may be performed in any order with respect to one another and/or concurrently. Steps 212 and 214 are optional. In optional step 212, a determination is made as to whether the indicated recipient is online. The determination may be made by user machine 112 sending a message to social network system 103 (having server systems 104*a-n*) to one of social network system 105 to determine whether user system 114 is online. User system 112 may periodically send messages to social network system 103. Alternatively, user system 112 may send one or more messages to social network system 103 that cause social network system 103 (having server systems 104*a-n*) to periodically send a message to social network system 105 requesting whether user system 114 is online and/or to send a message requesting social network system 105 to periodically send messages indicating whether user system 114 is online.

In optional step 214, an indication is placed in a webpage of interface 118 in view 120*a* as to the availability of the recipient. User system 112 may receive information from social network system 103 for rendering a webpage having the indication. For example, the indication may be displayed in the form of an icon or short text stating whether the recipient is currently online.

If the information about the intended recipient is already stored at social network system 103 (having server systems 104*a-n*) prior to starting method 200, steps 214 and 216 may be performed at any of several points with or with respect to in method 200. For example, steps 214 and 216 may be performed upon opening interface 118, prior to starting method 300, at the same point in the flow diagram where step 304 is located, and/or at any point prior in the flow diagram for method 200.

After step 210 or 214 (FIG. 2A), method 200 proceeds to step 216 in FIG. 2B.

In an embodiment, each of the steps of method 200 is a distinct step. In another embodiment, although depicted as distinct steps in FIG. 2A, step 202-214 may not be distinct steps. In other embodiments, method 200 may not have all of the above steps and/or may have other steps in addition to or instead of those listed above. The steps of method 200 may be performed in another order. Subsets of the steps listed above as part of method 200 may be used to form their own method.

FIG. 2B is a flowchart of an embodiment of method 215, which is a continuation of method 200. As illustrated, all steps, other than step 216, of method 200 are carried out by user machine 112. Step 216 may be carried out by either social network system 103 or social network system 105. Although step 216 is not part of the method carried out by user machine 112, step 216 is included in the flowchart representing method 215 for clarity. In step 216, social network system 103 and/or social network system 105 determines the type of communication of the message originating from user system 112 based on user input in step 209. User system 112 may have presented to the user multiple options for the type of message that the user would like to send. For example, the user may choose to follow another user, friend a user, send a message to a user, send an instant message to a user of another social network, etc. The next step in method 200 depends on the user's choice. The choice of the type of communication made by the user and indicated by user system 112 determines which step will be the next step in method 200.

If the user decides to follow another user on another social network, method 200 proceeds from step 216 to step 218. In step 218, user system 112 sends a request to social network system 103 to follow a user that is a member of a second social network, social network system 105.

In step 220, user system 112 may optionally receive a confirmation that the follow request was accepted or an indication that the request was denied. For example, a confirmation of the follow request may include a prompt, an email sent to the social media site, an email sent to the sender's inbox, and/or a webpage of the followed user (e.g., the user's wall).

Returning to step 216, after step 216, if the user decided to connect or friend another user on another social network (as indicated in step 209), method 200 proceeds from step 216 to step 222. In step 222, user system 112 may optionally send a connect request and/or a friend request to social network system 103, which is intended to the user of user system 114. For example, sending the connect request may include sending a request via a first social network, social network system 103, to second social network, social network system 105, for a user of the second social network to accept the first user (associated with user system 112) as a friend of the second user (associated with user system 114).

In step 224, the sender may optionally receive confirmation that a friend request was accepted. For example, the confirmation may include receiving a popup message or an email message sent to an inbox, or a message on the sender's wall.

Returning to step 216, after step 216, if the user decides to send a message, such as an inter-social network e-mail, inter-social network post, or an inter-social network instant message, to another user on another social network (as indicated in step 209), method 200 proceeds from step 216 to step 226.

In step 226, a message may be received from the sender (which is the user of user system 112) at user system 112. The sender may optionally input one or more messages, via interface 118. For example, inputting the messages may include inputting text, a picture, audio content, video content, and/or any type of message (or a mixture thereof). The message may be entered into a field of a prompt box for an instant message, an e-mail message, or another type of message that is sent to the recipient, via the sender's social network system and the receiver's social network system, to the receiver. In step 228, the sender may submit the message that was entered in step 226 to the sender's social network, social network system 103. In at least one embodiment, a message may be sent, via selecting an icon, such as an icon of a button.

In step 230, then the client may optionally receive a confirmation that the sending of the message was successful. For example, the confirmation may include an immediate prompt, an email, and/or a message on a wall of the sender.

Returning to step 216, if the sender decides to post a message on the wall of another user on another social network (as indicated in step 209), method 200 proceeds from step 216 to step 232. In step 232, user system 112 sends a request to social network system 103 to view a wall of a user that is a member of a second social network, social network system 105.

In one implementation, when the user decides to post or send a message to a recipient on a different social network, the user simply uses the standard post and/or messaging tools provided by their social network. In one implementation, the user uses a symbolic function such as the "$" sign to indicate that a user on a different social network should also receive the message. Or as discussed herein, an option to "post" or "share" the message or post may also include an option to post or send the message to user's on a different social network. In one implementation, if a recipient on a different social network follows or is a friend with the user, the posted message automatically is posted to the recipient's feed on his social network.

In step 234, user system 112 waits for a view of the requested wall. If the user receives a view of the wall, method 200 proceeds from step 234 to step 236. In step 236, the user system 112 optionally sends a message for posting on the wall received to social network system 103. Optionally, in step 238, user system 112 receives from social network system 103 a view of the wall with the added post. After step 238, method 200 proceeds to step 240. Returning to step 234, if user system 112 does not receive a view of the requested wall, method 200 proceeds from step 234 to step 240. For example, user system 112 may receive a message from social network system 103, that the wall is not public, the recipient does not exist, or a time period set by user system 112 for waiting for the view may expire.

After step 220, 224, 230, 234, or 238, method 200 proceeds to step 240. In step 240, user system 112 or 114 waits for input from the user as to whether to return to step 204 or to end the process. If the user chooses to exit the process, the process may be restarted with a further request to receive an updated webpage.

Figure 3A:
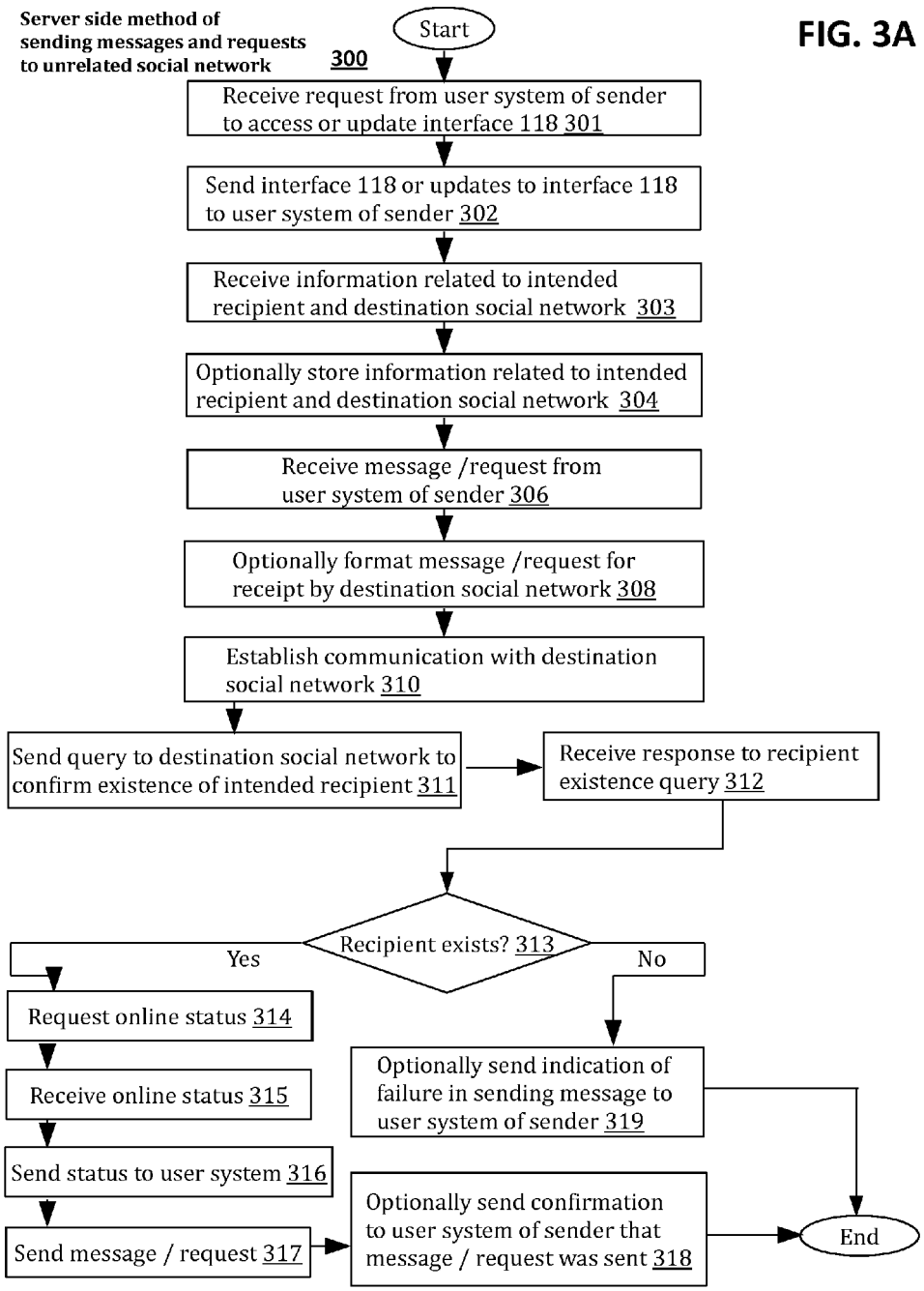
FIGS. 3A and 3B illustrate flow diagrams of an embodiment of a server side method of sending messages from a first social network to a second social network that is unrelated to the first social network.

In an embodiment, each of the steps of method 215 is a distinct step. In another embodiment, although depicted as distinct steps in FIG. 2B, step 216-240 may not be distinct steps. In other embodiments, method 215 may not have all of the above steps and/or may have other steps in addition to or instead of those listed above. The steps of method 215 may be performed in another order. Subsets of the steps listed above as part of method 215 may be used to form their own method.
Method Implemented by the Social Network System of the Sender FIG. 3A illustrates a flow diagram of an embodiment of a server side method 300 of sending messages on behalf of the sender from the sender's social network to unrelated social networks. In an embodiment, one of the social networks of method 300 hosts an on-demand multi-tenant database system such as that shown in FIG. 1.

In FIGS. 3A-4C as well as anywhere in this specification, whenever there is a communication between social network system 103 and 105, as necessary, prior to sending the communication, the communication is placed into the format determined by the protocol, which may require converting a communication from a format used within the social network sending the communication, e.g., from the format used within social network 103, to the format of the protocol. Similarly, in FIGS. 3A-4C as well as anywhere in this specification, whenever there is a communication between social network system 103 and 105, after receiving the communication, as necessary, the communication is converted from the format determined by the protocol to a format used within the social network that received the communication. In one implementation, the format used within the social network is the same as the protocol.

In step 301, a request is received from the user system 112 of the sender to access a portion of, or update to information in interface 118. For example, step 301 may include receiving a request the user for access to a webpage and/or receiving a choice of an option on a webpage of a website of a social network.

In step 302, interface 118 or an update to interface 118 is sent from social network system 103 to the user system 112 of the sender. By way of example, step 302 may include the server sending a webpage containing a number of choices for sending messages to a user in a different social network (as well as having choices for sending messages to a user in the same social network).

In step 303, information is received at social network system 103 related to an intended recipient that is a member of a destination social network system 106a-n. In at least one embodiment, step 303 may result from the user filling out the information on a webpage or in a section of a webpage on a social network site, and user system 112 sending the information entered by the user to social network system 103. The information that the user needs to send a message may include, but is not limited to, one or more of the following: the recipient's name, username, password, email address, the recipient's network and/or how the user knows the recipient.

In optional step 304, information is stored related to the intended recipient and destination social network. In at least one embodiment, step 304 may include storing any information received in step 303, such as the name of the intended recipient and the social network that the intended recipient is a member of By storing the information as part of step 304, in the future, messages may be sent to the intended recipient more efficiently.

In step 306, a message is received from user system 112 at social network system 103 that is intended to be sent to the user of a different social network. A message can be a simple request for information, a request for permission to post, a message including text or other data to post in a social feed, etc. Embodiments may use message and request interchangeably (e.g., by substituting work request for work message). Step 306 may include receiving the text of an inter-social network e-mail, a text to post on a wall, text to accompany a request to follow the other user, and/or text to accompany a request to friend or connect to the other user.

In optional step 308, the message may be placed by social network system 103 (having server systems 104a-n) into a particular format established by the protocol for receipt by destination social network. For example the format may include a particular location in the message for an indication of the type of message, a particular location for the text accompanying the message, a particular location for an identifier of the intended recipient, a particular location for an identifier of the social network of the intended recipient, a particular location for an identifier of the sender, and a particular location for an identifier of the social network of sender.

In step 310, communications are established by server systems 104a-n with the destination social network, social network system 105 (having server systems 106a-n). In at least one embodiment, step 310 may include a handshaking procedure, such as social network system 103 (having server systems 104a-n) sending a message to social network system 105 indicating that a message is coming and receiving an acknowledgment from social network system 105 at social network system 103.

In step 311, a query is sent from social network system 103 (having server systems 104a-n) to a destination social network, social network system 105 (having server systems 106a-n) to confirm existence of an intended recipient. In at least one embodiment, step 311 may include sending the information that the sender included in the message, and requesting that social network system 105 (having server systems 106a-n) use the information to formulate a search query to find the recipient in a database of members of social network system 105 (having server systems 106a-n).

In step 312, a response indicating whether recipient exists is received from social network system 105 at social network system 103 (having server systems 104a-n). In at least one embodiment, step 312 may include a response indicating that the intended recipient was not found or a response indicating that the recipient was found.

In step 313, based on the response from social network system 105 (having server systems 106a-n), social network system 103 (having server systems 104a-n) determines whether the recipient exists.

If the recipient exists (following the "Yes" branch of the flowchart), the social network system 103 (having server systems 104a-n) proceeds to step 314. In step 314, a message is sent from social network system 103 to social network system 105 (having server systems 106a-n) requesting whether the intended recipient is online.

In step 315, in response to step 314, a message is received at social network system 103 from social network system 105 (having server systems 106a-n) indicating whether the intended recipient is online.

In step 316, the indication of whether the intended recipient is online is sent from social network system 103 to user system 112. If the information about the intended recipient is already stored at social network system 103 (having server systems 104a-n) prior to starting method 300, steps 314-316 may be performed at any of several points with or with respect to method 300. For example, steps 314-316 may be performed upon opening interface 118, prior to starting method 300, at the same location in the flow diagram where step 304 is located, and/or at any location prior in the flow diagram for method 300.

In step 317, social network system 103 (having server systems 104a-n) may send the message/request to social network system 105 (having server systems 106a-n) on behalf of user system 112. Step 317 may include sending an instant message. Optionally, a confirmation of the receipt of the message may be received at social network system 103 (having server systems 104a-n) from social network system 105.

Then in optional step 318, a confirmation is sent from social network system 103 (having server systems 104a-n) to user system 112 of the sender that the message/request was sent.

Returning to step 313, if the recipient does not exist, then in step 319 the server may optionally send an indication of failure in sending the message to the user system of sender (following the "No" branch of the flowchart). In at least one embodiment, step 319 may include an immediate prompt, an email, or a message on a wall and the method may end until further requests are received. The message may specifically say the recipient is not a member of the chosen network or the message may simply say that the message was not sent due to a failure and provide more information about why there was a failure is sending the message. As part of sending a message, the sender's social network system may set an indicator indicating the type of message (e.g., e-mail, instant message, friend request, request to view wall, follow request). As part of the receiving the message, the receiving social network may read the indicator to determine the type of message received.

In an embodiment, each of the steps of method 300 is a distinct step. In another embodiment, although depicted as distinct steps in FIG. 3A, step 302-319 may not be distinct steps. In other embodiments, method 300 may not have all of the above steps and/or may have other steps in addition to or instead of those listed above. The steps of method 300 may be performed in another order. Subsets of the steps listed above as part of method 300 may be used to form their own method.

Figure 3B:
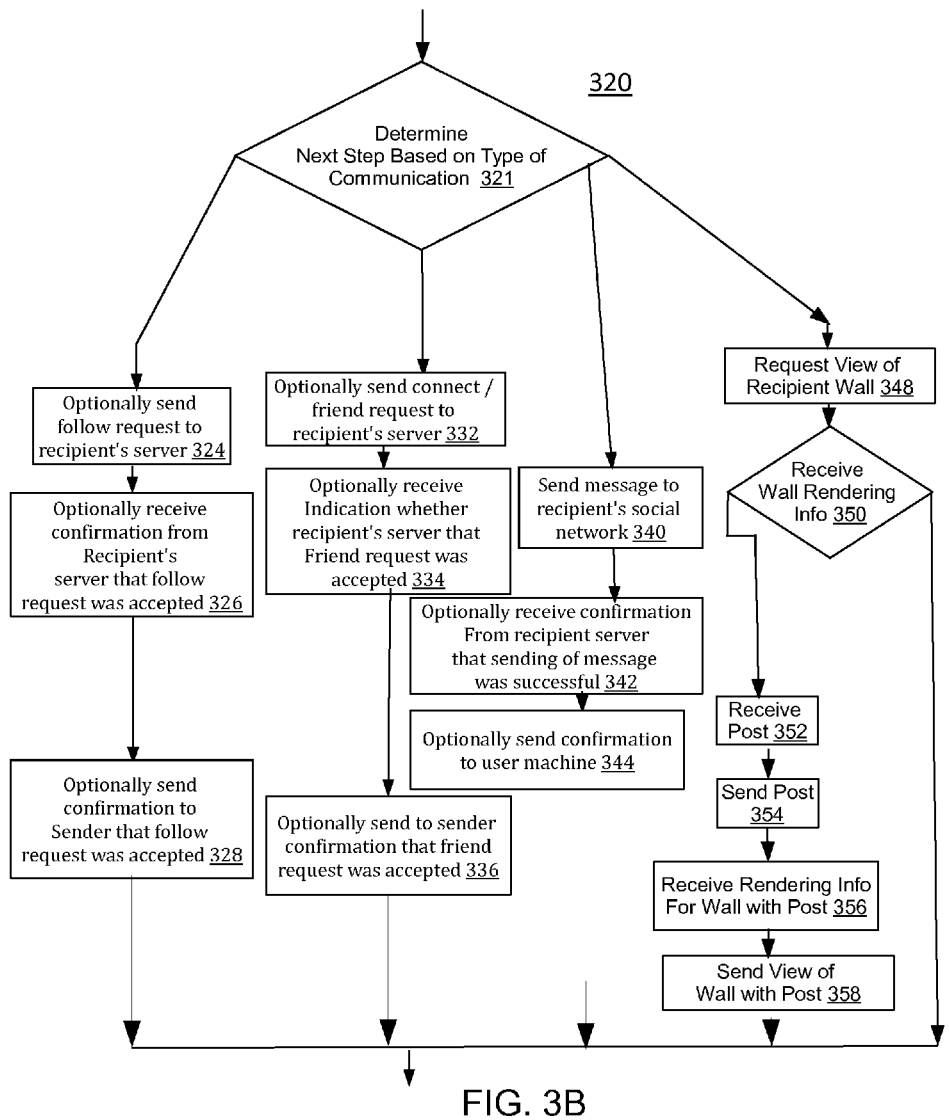

FIG. 3B illustrates method 320, which is an embodiment of step 317 and 318 of method 300. In step 321 social network system 103 determines the type of communication received during step 306 from user system 112.

If in step 321, social network system 103 determines that the type of message received was a request to follow another user on another social network, method 320 proceeds from step 321 to step 324.

In step 324, after placing the follow request (which was received from user system 112 in step 306) into the format of protocol 110, social network system 103 may optionally send to social network system 105 the follow request.

In step 326, social network system 103 may optionally receive from social network system 105 a confirmation that the follow request was accepted or an indication that the request was denied.

In step 328, social network system 103 may send the confirmation (which was receive from social network system 105) to user system 112 indicating the follow request was accepted or an indication that the request was denied.

Prior to discussing the next step, after step 328, the other branches of method of 320 that are parallel to step 324 will be discussed.

Returning to step 321, after step 321, if the user decided to connect or friend another user on another social network (as indicated in step 209, FIG. 2A, and step 306, FIG. 3A), method 320 proceeds from step 321 to step 332. For example, if it is determined that the message of step 306 was a request to friend a user on another social network, method 320 proceeds from step 321 to step 332. In step 332, after placing the friend request (which was received from user system 112 in step 306) into the format of protocol 110, social network system 103 may optionally send the connect request and/or a friend request to social network system 105 to be forwarded to user system 114.

In step 334, the social network system 103 may optionally receive from social network system 105 an indication that is formatted according to protocol 110 that indicates whether the friend request was accepted or denied. In step 336, the social network system 103 may optionally send an indication of whether the friend request was accepted or denied to user system 112. Prior to discussing the next step after step 336, the branch of method 320 that starts with step 340 will be discussed.

Returning to step 321, after step 321, if the user decides to send a message to another user on another social network (as indicated in step 209, FIG. 2A, and step 306, FIG. 3A), method 320 proceeds from step 321 to step 340. For example, if it is determined that the message received in step 306, is an inter-social network e-mail or inter social network instant message intended for user system 114, method 320 proceeds from step 321 to step 340. In step 340, after placing the message received in step 306 (FIG. 3A) into the format of protocol 110, the message (that was received from user system 112) may be sent from social network system 103 to social network system 105.

In step 342, social network system 103 may optionally receive a confirmation from social network system 105 in the format of protocol 110 that the sending of the message was successful.

In step 344, social network system 103 may optionally send the confirmation from social network system 103 to user system 112 that the sending of the message was successful.

Returning to step 321, if the user decides to post a message on a wall of another user on another social network (as indicated in step 209, FIG. 2A, and step 306, FIG. 3A), method 320 proceeds from step 320 to step 348. For example, if social network system 103 determines that the message received from user system 112 in step 306 (FIG. 3A) was a request to view a wall of another user on another social network (as indicated in step 209, FIG. 2A, and step 306, FIG. 3A), method 320 proceeds from step 320 to step 348. In step 348, social network system 103 a request to view the wall of the user of user system 114 is sent, in the format of the protocol 110, from social network system 103 to social network system 105.

In step 350, social network system 103 optionally receives, e.g., in the format of protocol 110, information about a view of the wall requested from social network system 105. If the user decides to post a message on the wall, method 320 proceeds from step 350 to step 352. In step 352, the social network system 103 optionally receives a message from user system 102 that is intended to be posted on the wall.

In step 354, the social network system 103 optionally sends the message that is intended to be posted from social network system 103 to social network system 105. Optionally, in step 356, social network system 103 receives (e.g., in the format of protocol 110), from social network system 105, information about the wall with the added post. In step 358, social network system 103 sends from social network system 103 to user system 112 information for rendering a view of the wall with the added post (the rendering information is determined by social network system 103, but is based on the information sent in the message from social network system 105). After step 358, method 320 terminates, terminating method 300.

Returning to step 350, if user system 112 does not send a message for posting on the wall, method 320 terminates terminating method 300. Similarly after steps 328, 336, and 344 method 320 terminates, which terminates this embodiment of method 300.

In this way and other ways described herein, a user is provided by social network system 103 with a wall and/or a feed that shows posts, comments, messages, etc. not only from users of social network 103, but also shows posts, comments, messages, etc. from users of other social networks, such as social network 105.

In an embodiment, each of the steps of method 320 is a distinct step. In another embodiment, although depicted as distinct steps in FIG. 3B, step 321-358 may not be distinct steps. In other embodiments, method 320 may not have all of the above steps and/or may have other steps in addition to or instead of those listed above. The steps of method 320 may be performed in another order. Subsets of the steps listed above as part of method 320 may be used to form their own method.

Method Implemented by the Social Network System of the Receiver

FIG. 4A illustrates a flow diagram of an embodiment of a server side method 400 of receiving messages from unrelated social networks. In an embodiment, method 400 may be implemented in social network system having an on-demand multi-tenant database system such as that shown in FIG. 1.

In step 402, social network system 105 (having server systems 106a-n) receives a request from social network system 103 (having server systems 104a-n) to confirm that the intended recipient is a member of the social network of social network system 105 (having server systems 106a-n).

In step 404, social network system 105 checks to see whether the social network of social network system 103 is an approved social network. By way of example, step 404 may include searching for an identifier of the social network of social network system 103 in a list stored at social network system 105 (having server systems 106a-n) to determine if the identifier is in the list. If the identifier is found in the list, it is assumed that the social network of social network system 103 is approved and if the identifier is not found, it is assumed that the social network of social network system 103 is not approved. Note: the identifier and the message may be encrypted or hash tagged for security. This may be true in this message sending context or in other contexts described herein.

If the social network of social network system 103 is not an approved social network, then method 400 proceeds from step 404 to step 406 (following the "No" branch of the flowchart). In step 406, a message may be sent from social network system 105 (having server systems 106a-n) to the sender's social network, social network system 103, indicating the network was refused. By way of example, step 406 may include sending an email message, or a prompt/box that tells the user in real-time, substantially real-time, or at some predetermined interval that the message was not approved. The message may also include an audio sound or may be an audio message. After step 406, method 400 ends.

Returning to step 404, if the social network of social network system 103 is an approved network, then method 400 proceeds from step 404 to step 408 (following the "Yes" branch of the flowchart). In step 408, the server may check to see whether the recipient exists. By way of example, step 408 may include searching a list of members of the network associated with social network system 105 to identify whether the recipient is a member of that social network.

If the recipient does not exist, then method 400 proceeds from step 408 to step 410 (following "No" branch of the flowchart). In step 410, the social network system 105 may send a message to sender's social network, social network system 103, indicating that the recipient does not exist. By way of example, sending the message indicating that the recipient does not exist may include an inter-social network email message, or a prompt/box that tells the user in real-time, substantially real-time, or at some predetermined interval that the network was not approved. The message may also include a sound portion, such as an audio message. After step 410, method 400 terminates.

If the recipient does exist, then method 400 proceeds from step 408 to step 412 (following the "Yes" branch of the flowchart). In step 412, social network system 105 may check to see whether the sender is blocked. By way of example, step 412 may include searching a list of blocked senders, a list of members of the sender's social network, and/or a list of approved senders to see whether the sender is included in the list. In at least one embodiment, a sender may be blocked if the recipient added the sender to the list of blocked senders, reported the sender for sending spam, or otherwise did not want to receive messages from the sender. Checking to see whether the sender is blocked, may help avoid situations in which the sender is sending from a false account of an approved social network.

If the sender is blocked, then method 400 proceeds from step 412 to 414 (following the "Yes" branch of the flowchart). In step 414, a message is sent from social network system 105 to the sender's social network, social network system 103, indicating that the sender is blocked. By way of example, step 414 may include an email message, a message on a wall or a prompt/box that tells the user in real-time, substantially real-time, or at some predetermined interval that the network was not approved. The message may also include sound or may be an audio message. After step 414, the method ends.

Returning to step 412, if the sender is not blocked, then method 400 proceeds from step 412 to step 416 (following the "No" branch of the flowchart). In step 416, the server may check to see if the message is spam, and if the message is spam, then method 400 may end. By way of example, checking whether the message is spam may include identifying characteristics associated with the message that identify the message as being spam, such as the lack of a subject of the presence of keywords associated with products that are commonly advertised via spam. Alternatively or additionally, the user may view the message and indicate that the message is spam.

If the message is not spam, then method 400 proceeds from step 416 to step 418 (following the "No" branch of flowchart). In step 418, social network system 105 may store the message in association with the recipient's account, such as in an inbox or on a wall of the recipient.

Next, in step 420, the social network system 105 (having server systems 106a-n) may optionally send an indicator to the recipient, user system 114, that the message has been received from the sender. By way of example, step 420 may include sending an email, instant message, or message on a wall in a social network.

Next in step 422, the social network system 105 (having server systems 106a-n) may optionally send the user system of recipient interface 118/update. After step 422, method 400 ends.

Returning to step 416, if the message is a spam message ("Yes"), then method 400 proceeds from step 416 to 424. In step 424, social network system 105 may send a prompt to block the sender/refuse the message. By way of example, an email message, or a prompt/box that may be sent to the sender in real-time, substantially real-time, or at some predetermined interval that the network was not approved. By way of example, step 424, depending on the type of communication, may include storing the message under a designation of "Spam." For example, there may be a folder or other storage area labeled spam (or labeled with an equivalent label), in which spam messages are stored. By storing the message under a designation "Spam," the user may decide whether the user wants to open the message. Different types of messages that have been determined to be spam may be treated differently. For example, an inter-social network e-mail that have been determined to be spam may be stored in a spam folder, where as an inter-social network instant message that has been determined to be spam may never be passed on to the intended recipient.

Next, in step 426, social network system 105 may receive blocking instructions. The social network system 105 (having server systems 106a-n) may receive or store instructions about how to handle blocked messages. For example, the instructions may indicate which part of the user's social network page is blocked from the sender. A determination of whether to block the message may depend on the type of message. For example, inter-social network e-mail for a particular sender may be blocked, but inter-social network chat messages from the same sender may not be blocked. As another example, at step 426, social network system 105 (having server systems 106a-n) may wait for the intended recipient to indicate how to handle the message.

In step 428, social network system 105 (having server systems 106a-n) may decide how to handle the incoming message based on the instructions of step 426 to accept the message.

If the server decides to accept the message, method 400 proceeds from step 428 to step 430 (following the "Yes" branch of the flowchart). In step 430, the message may be delivered with an optional spam indicator. By way of example, step 430 may include a warning that the message may be Spam at the beginning of the message.

If the server decides not to accept the message ("No"), method 400 proceeds from step 428 to step 432, In step 432, social network system 105 (having server systems 106a-n) may decide whether to block the sender of the message (in step 428, only the message is blocked, whereas in step 432 the sender is blocked). The fact that message was blocked in step 428, may be an indication that all messages from the same sender should be blocked. By way of example, step 428 may include adding the sender to a list of blocked users. The blocked users may be identified by name, username, password, email address, name or username associated with any one of the social networks, profile, etc. If in step 432, social network system 105 decides "No" not to block the sender, method 400 ends (because even though the sender was not blocked the message was blocked).

Returning to step 432, if step 432 decides "Yes" to block the sender, then method 400 proceeds from step 432 to step 434. In step 434, the sender is blocked. By way of example, this may include adding the sender to a list of blocked users and/or removing the sender from a list of approved senders. After step 434, method 400 ends.

In an embodiment, each of the steps of method 400 is a distinct step. In another embodiment, although depicted as distinct steps in FIG. 4A, step 402-434 may not be distinct steps. In other embodiments, method 400 may not have all of the above steps and/or may have other steps in addition to or instead of those listed above. The steps of method 400 may be performed in another order. Subsets of the steps listed above as part of method 400 may be used to form their own method.

FIG. 4B illustrates a flow diagram of an embodiment of a server side method 450 of receiving requests from unrelated social networks. In one embodiment, one of the social networks of method 450 may use an on-demand multi-tenant database system. Method 450 is an alternative embodiment to method 400.

In step 452, a request may be received at social network system 105 (having server systems 106*a-n*) to confirm the recipient's existence from the sender's social network, social network system 103 (having server systems 104*a-n*). At step 454, the social network system 105 (having server systems 106*a-n*) may ascertain whether the social network of social network system 103 (having server systems 104*a-n*) is an approved network. By way of example, step 452 may include searching the list of social networks that have agreed to be a part of a group of social networks that permit inter-social network communications among one another. If the social network of social network system 103 (having server systems 104*a-n*) is not a member, method 450 proceeds from step 454 to step 456.

In step 456, social network system 103 (having server systems 104*a-n*) may send a message to the sender's social network indicating the network was not an approved network and, hence, refused. By way of example, step 456 may include sending an email message, a message on the wall, or a prompt/box that tells the user in real-time, substantially real-time, or at some predetermined interval that the network was not approved. The message may also include an audio sound or may be an audio message. After step 456 method 450 ends.

Returning to step 454, if social network system 103 (having server systems 104*a-n*) is an approved network, method 450 proceeds from step 454 to step 458 (following the "Yes" branch of the flowchart). In step 458, the social network system 105 (having server systems 106*a-n*) may check to see if the recipient is valid. By way of example, step 458 may include searching for the recipient in a list of members of the social network to which the message was sent.

In step 458, if the recipient does not exist, then method 450 proceeds from step 458 to step 460 (following the "No" branch of the flowchart). In step 460, social network system 105 (having server systems 106*a-n*) may optionally send an indication of the failure to find the recipient, via social network system 103 (having server systems 104*a-n*) to the user system of the sender. In an embodiment, step 460 may include sending an email message, placing a message on the wall, or a prompt/box that tells the user in real-time, substantially real-time, or at some predetermined interval that the network was not approved. After step 460, method 450 ends.

Returning to step 458, if the recipient does exist ("Yes"), then method 450 proceeds from step 458 to step 462. In step 462, the social network system 105 (having server systems 106*a-n*) may send an indication to user machine 114 of the recipient that the request was received. In at least one embodiment, step 462 may include sending an email message, a message on the wall, or a prompt/box that tells the user in real-time, substantially real-time, or at some predetermined interval that the request was received.

In step 464, the social network system 105 (having server systems 106*a-n*) receives instructions from the recipient. For example, if the request was a friend request, the recipient may decide not to accept the friend request and may send instructions not to set up the connection. In step 468, social network system 105 (having server systems 106*a-n*) may decide whether to accept the request based on the recipient's instructions received in step 464.

If in step 468, social network system 105 (having server systems 106*a-n*) decides not to accept the request, method 450 proceeds from step 468 to step 470 (following the "No" branch of the flowchart). In step 470, social network system 105 (having server systems 106*a-n*) may optionally send an indicator to the sender's social network that the request was rejected. In at least one embodiment, this may include an email, immediate message, or message on a wall in a social network and the method may end until further requests are received. After step 470 method 450 ends.

Returning to step 468, if social network system 105 (having server systems 106*a-n*) decides to accept the request, then method 450 proceeds from step 468 to step 472 (following the "Yes" branch of the flowchart). In step 472, the social network system 105 (having server systems 106*a-n*) may optionally send an indicator to the sender's social network that the request was accepted.

Next, in step 474 then the social network system 105 (having server systems 106*a-n*) may store an indicator that the request was accepted. In at least one embodiment, step 474 may include an email, instant message, or message on a wall in a social network and the method may end and may be restarted when further requests are received.

In an embodiment, each of the steps of method 450 is a distinct step. In another embodiment, although depicted as distinct steps in FIG. 4B, step 452-474 may not be distinct steps. In other embodiments, method 450 may not have all of the above steps and/or may have other steps in addition to or instead of those listed above. The steps of method 450 may be performed in another order. Subsets of the steps listed above as part of method 450 may be used to form their own method.

Figure 4C:
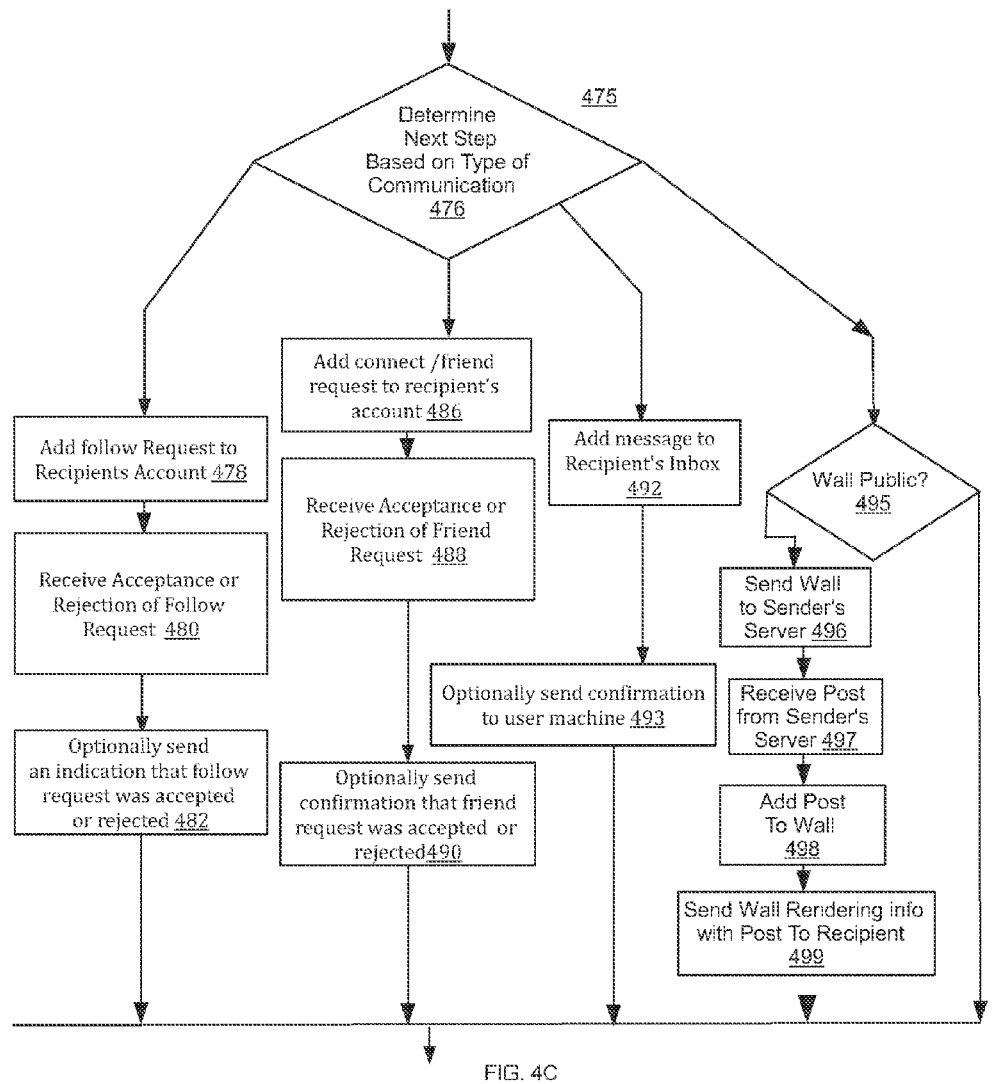
FIG. 4C illustrates a flow diagram of an embodiment of some steps of the method of FIGS. 4A and 4B.

FIG. 4C describes method 475, which is an embodiment of steps 420 and 422 of method 400 (FIG. 4A) or steps 462-472 of method 450 (FIG. 4B). In FIG. 4C, in step 474 social network system 103 determines the type of communication received based on the type indicated by the protocol. For example, there may be an indicator of the type of message, which is sent with the message, when the message is in the format determined by protocol 110.

If it is determined that a follow request was received, method 475 proceeds from step 476 to step 478. In step 478, social network system 105 may add a request to follow the user of user system 114 to an account at social network system 105, where user system 114 may view the request the next time user system 114 accesses social network system 105 and/or user system 114 may send the follow request to user system 114.

In step 480, when social network system 105 receives a reply to the follow request, social network system 105 determines whether user system 114 indicated to accept the follow request.

In step 482, social network system 105 may send a confirmation that the follow request was accepted or an indication that the follow request was not accepted. Additionally, if the follow request was accepted, settings on the account being followed may be changed to allow the user of user system 112 to follow the user of user system 114 at social network system 105, After step 482, method 475 terminates.

Returning to step 476, if it is determined that a request to connect or friend another user on another social network was received, method 475 proceeds from step 476 to step 486. In step 486, social network system 105 may add the connect request and/or the friend request to the user account of the user of user system 114 and/or may send the request to user system 114.

In step 488, upon receiving input from user system 114, social network system 105 determines whether the connect/friend request was accepted or denied. If the connect/friend request was accepted, then settings may be changed at the user's account. For example, the user of user system 112 may be added to a list of friends in the account at social network system 105 of the user of user system 114. In step 490, social network system 105 may optionally send an indication of whether the connect/friend request was accepted to social network system 105. The indication may be sent from social network system 105 to social network system 103.

Returning to step 476, if it is determined that the type of the message is an e-mail or instant message, method 475 proceeds from step 476 to step 492. In step 492, the message is placed in the user's inbox, or if the message is of the instant message type and the user is online the message appears in an instant message box.

In step 493, social network system 105 may optionally send a confirmation from social network system 105 to social network system 103 that the sending of the message was successful. When a reply is sent, the methods of FIGS. 2A-5B are performed except with user system 112 having the role of user system 114, user system 114 having the role of user system 112, social network system 103 having the role of social network system 105, and social network system 105 having the role of social network system 103.

Returning to step 474, if the type of the message is a request to view a wall, method 475 proceeds from step 476 to step 495. In step 495, social network system 105 determines whether the wall of user system 114 is public, and therefore viewable by the user of user system 112.

If in step 495 it is determined that the wall is public, then method 475 proceeds from step 495 to step 496. In step 496, social network system 105 optionally sends information for rendering a view of the wall to social network system 103. If the user decides to post a message on the wall, method 475 proceeds to step 497. In step 497, the social network system 105 optionally receives a message from social network system 103 with a request to post the message on the wall.

In step 498, the social network system 105 places the message on the wall. For example, the message may be stored in a storage area and in a format associated with posts on the wall. In step 499, social network system 105 sends to social network system 103 information for rendering a view of the wall with the added post. After steps 482, 490, 493, and 499, method 475 terminates.

Returning to step 495, if the wall is not public, method 475 terminates.

In an embodiment, each of the steps of method 475 is a distinct step. In another embodiment, although depicted as distinct steps in FIG. 4C, step 476-499 may not be distinct steps. In other embodiments, method 475 may not have all of the above steps and/or may have other steps in addition to or instead of those listed above. The steps of method 475 may be performed in another order. Subsets of the steps listed above as part of method 475 may be used to form their own method.

Method Implemented by the Machine of the Receiver

Figure 5A:
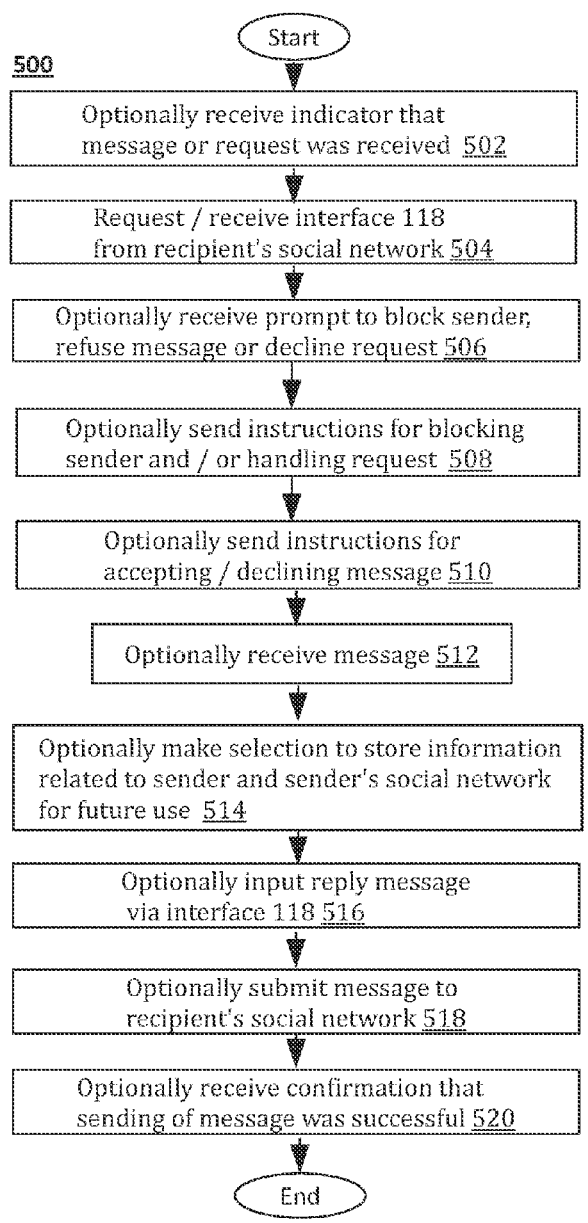
FIGS. 5A and 5B illustrate flow diagrams of an embodiment of a client side method of receiving requests from unrelated social networks.

FIG. 5A illustrates a flow diagram of an embodiment of a client side method 500 of receiving requests from unrelated social networks. In one embodiment, method 500 may be implemented by a social network system having an on-demand multi-tenant database system such as that shown in FIG. 1.

Optionally in step 502, an indication is received at user system 114 that a message or request was received from user system 112 via social network system 103 (having server systems 104a-n) and social network system 105. In at least one embodiment, receiving the indication that the message was received may include receiving an email message, a message on the wall, or a prompt/box that tells the user in real-time, substantially real-time, or at some predetermined interval that the request was received.

In step 504, interface 118 is received by user system 114 from social network 105 or a request for interface 118 is sent from user system 114 to social network system 105 and interface 118 is received.

In step 506, optionally a prompt is received, which presents to the user an option to block the sender, refuse the message, and/or decline the request. In at least one embodiment, step 506 may include sending an interactive box that allows the user to decide how to handle the incoming message and/or request.

Optionally, in step 508, instructions are sent from user system 114 to social network system 105 (having server systems 106a-n) for blocking the sender and/or otherwise handling the sender.

Optionally in step 510, instructions are sent from user system 114 to social network system 105 (having server systems 106a-n) for accepting, declining, or otherwise handling the message.

Optionally, in step 512, (if the message was not blocked by user system 114) the message is received at user system 114 from social network system 105.

Optionally, in step 514, a selection is made at user system 114 to send a message to social network system 105 (having server systems 106a-n) to store information related to the sender and/or the sender's social network for future use. For example, user system 114 may request that a profile be established at social network system 105 (having server systems 106a-n) for the sender (associated with user system 112).

Optionally, in step 516, a reply message is input by the recipient, via interface 118 at user system 114. The reply message may be a message that responds to a text message sent by the sender and/or may be a text message or other message responding to a friend request, a post on a wall, and/or a request to follow the recipient. The reply message may be in the form of a post on the sender's wall, an inter-social network instant message, and/or an inter-social network e-mail, for example.

Optionally, in step 518, a submit request is received at user system 114, via user input from the recipient into user system 114 (the recipient is associated with user system 114). The submit request may cause user system 114 to send the message prepared at user system 114 to social network system 105 (having server systems 106a-n), which is then automatically sent, via social network system 103 to user system 112. Alternatively, the message prepared in step 516 by the user is automatically sent to social network system 105 (having server systems 106a-n), but is not sent to social network system 103 or user system 112, unless and until the submit request is received from user system 114 at social network system 105.

In step 520, optionally, a confirmation is received, from social network system 105 at user system 114, that the sending of the reply message was successful. When user system 114 sends an inter-social-network-communication back to user system 112, the methods 200-500 are carried out as described above except that any mention of user system 112 is replaced with user system 114, any mention of user system 114 is replaced with user system 112, any mention of social network system 103 is replaced with social network system 105, and any mention of social network system 105 is replaced with social network system 103, In an embodiment, each of the steps of method 500 is a distinct step. In another embodiment, although depicted as distinct steps in FIG. 5A step 502-520 may not be distinct steps. In other embodiments, method 500 may not have all of the above steps and/or may have other steps in addition to or instead of those listed above. The steps of method 500 may be performed in another order. Subsets of the steps listed above as part of method 500 may be used to form their own method.

Figure 5B:
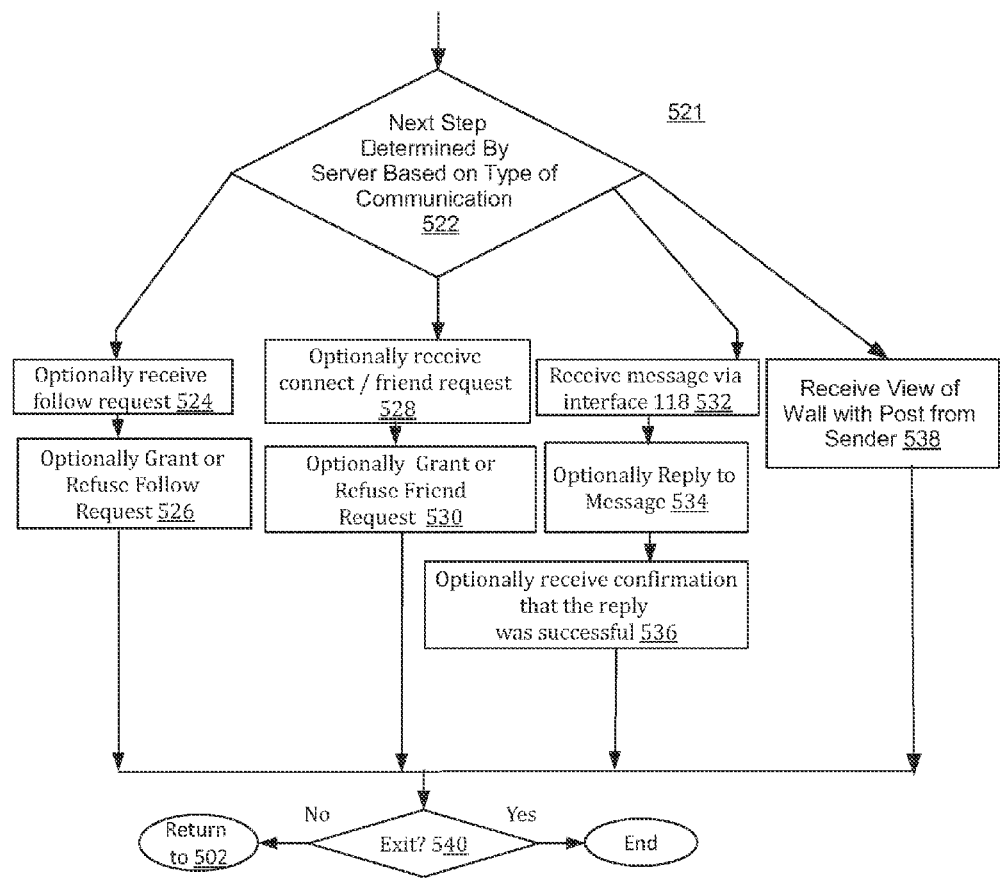

FIG. 5B shows another embodiment of a method of having inter-social network communications, which may be an embodiment of step 512-520 of method 500. In FIG. 5B, although all steps, other than step 522, FIG. 5B are carried out by user machine 114, step 522 is not carried out by user machine 114, but by either social network system 103 or social network system 105. Social network system 103 and/or social network system 105 determines the type of communication based on user input in step 209 (FIG. 2A).

If user system 112 requests to follow a user on social network system 105, method 521 proceeds from step 522 to step 524. In step 524, user system 114 receives a request from social network system 105 for the user of user system 112 to follow the user of user system 114, who is a member of social network system 105.

In optional step 526, user system 114 may indicate whether to accept or reject the follow request, which may thereby send an indication to social network system 105 that the follow request was accepted or rejected.

Prior to discussing the next step that comes after step 526 in method 521, the other branches of method of 521 that are parallel to step 524 will be discussed.

Returning to step 522, after step 522, if the user of user system 112 decided to connect or friend the user of user system 114 on social network system 105 (as indicated in step 209, FIG. 2A), method 521 proceeds from step 522 to step 528. In step 528, the user system 114 may optionally receive a connect request and/or a friend request from social network system 105. For example, receiving the connect request may include receiving a request via a social network system 105 from social network system 103 on behalf of a user of social network system 103 to accept the user of user system 112 as a friend of the user of social network system 114.

In step 530, the user system 114 may optionally send a confirmation that a friend request was accepted or rejected. Prior to discussing the next step after step 530, the branch of method 521 that starts with step 532 will be discussed.

Returning to step 522, after step 522, if the user of user system 112 decides to send a message to the user of user system 114 on social network system 105 (as indicated in step 209, FIG. 2A), method 521 proceeds from step 522 to step 532. In step 532, a message may be received by the user at user system 114 from social network system 105, which came, via social network system 103, from user system 112. For example, the message may be in an e-mail format, in an instant message format, or in some other message format.

In step 534, user system 114 may optionally send a reply message to social network system 105, which is intended to be sent, via social network system 103, to user system 112.

In step 536, then user system 114 may optionally receive confirmation that the reply message was successful.

Returning to step 522, if the user of system 112 decides to post something on the wall of the user of user system 114 (as indicated in step 209, FIG. 2A), method 200 proceeds from step 522 to step 538. In step 538, user system 114 receives from social network system 105 a view of the wall of the user of user system 114 that includes a post from the user system 112 (even though the user of user system 112 does not belong to the same social network as the user of user system 114).

After step 524, 528, 532, or 538, method 521 proceeds to step 540. In step 540, user system 114 waits for input from the user as to whether to return to step 502 or to end the process. If the user chooses to exit the process, the process may be restarted with a further request to receive an updated webpage.

In an embodiment, each of the steps of method 521 is a distinct step. In another embodiment, although depicted as distinct steps in FIG. 5B, step 522-540 may not be distinct steps. In other embodiments, method 521 may not have all of the above steps and/or may have other steps in addition to or instead of those listed above. The steps of method 521 may be performed in another order. Subsets of the steps listed above as part of method 521 may be used to form their own method.

Social Network System Memory

Figure 6:
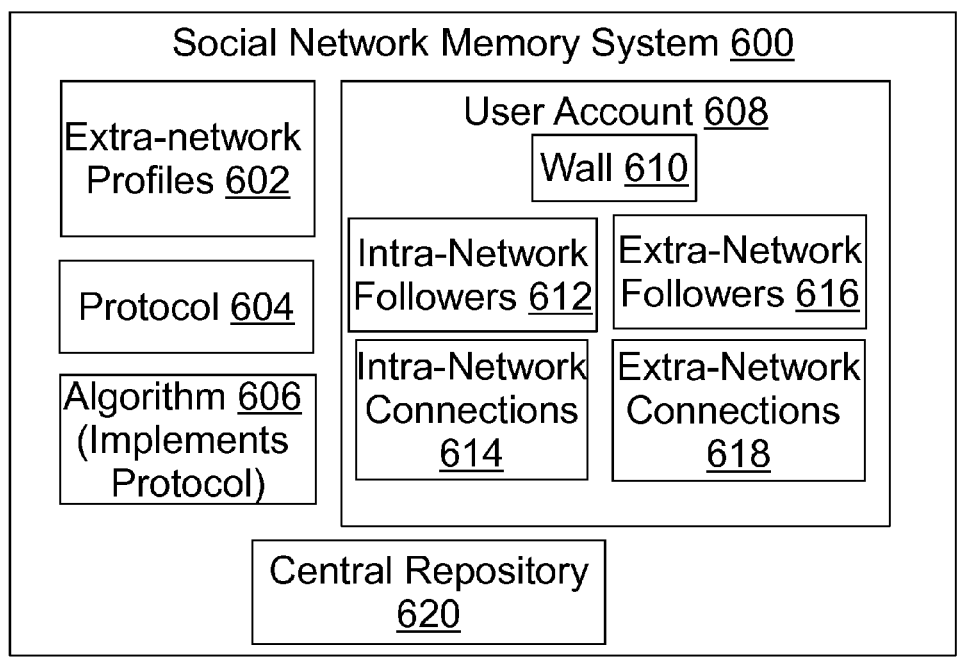
FIG. 6 illustrates a block diagram of an embodiment of a memory system of a social network.

FIG. 6 illustrates a block diagram of an embodiment of a social network memory system 600. FIG. 6 illustrates a block diagram of social network memory system 600 that may be used in the inter-social-network protocols described herein. Social network memory system 600 may include extra-network profiles 602, protocol 604, algorithm 606, and user account 608, which may include wall 610, intra-network followers 612, intra-network connections 614, extra-network followers 616, extra-network connections 618, and central repository 620. In other embodiments, the social network memory system 600 may not have all of the components listed and/or may have other elements instead of, or in addition to, those listed above.

Extra-network profiles 602 are profiles of users from one or more other social networks. In this case, the profiles may be from any social network participating in the protocol (e.g., those profiles of social networks that have chosen to allow inter-network communications between users). For example, a user might be using a social network such as Chatter® and may want the social network to be able to keep track of other friends in other networks, such as Twitter® and Facebook®.

Protocol 604 may be an embodiment of protocol 610. Protocol 604 is the convention agreed upon by the networks involved in the social network cooperation system for sending messages, posting messages, receiving messages, etc. Protocol 604 is a standardized format for sending messages between different networks (e.g., walls, inbox, for posting messages) and allows for conversion from one format to another. Protocol 604 will be discussed further in conjunction with FIGS. 7 and 8. Protocol 604 defines a standard format for profile and other features so that each social network, in one embodiment, may maintain profiles for users of other networks within the group of networks that agree to the protocol (e.g., so the out of network users show up in "friends" lists and are easily searchable and includable on messages). These profiles may be very sparse (e.g., limited to the user's name and/or originating social network) or, in some implementations, the profiles may be as robust as any other profile in the social network.

The algorithm 606 may be an algorithm for implementing protocol 604, which may include steps that allow conversion from the format used by the protocol to a format used by a local server or from a format used by a local server to the protocol format. The algorithm 604 has a driver to translate whatever protocol used in operating system of the protocol to something the other operating system understands. In one implementation, participating social networks do not need to convert formats because they use the same protocol throughout their systems.

User account 608 (which may include Wall, intra-network followers, extra-network followers, Intra-network connections and Extra-network connections) is the part of the memory associated with each user that stores information related to the user's account, such as login information, billing information, information about the user's wall, the user's inbox, the user's sent messages. The wall 610 is an area in memory for storing information about the wall of the user having user account 608. The wall 610 is an agreed-upon format for posting messages at the user's account that others may view if the user has granted access to the wall. Wall 610 may store the posts that appear on the user's wall.

The intra-network followers 612 is a storage area for storing information about followers of the user having user account 608. The followers may be those users that have been granted access to view parts of the user account 608. The intra-network connections 614 include a memory location for storing information about the connections that are associated with the specific users that are within the social network of the current user. The extra-network followers 616 is a memory location for storing information about users that follow that user of user account 608 that are associated with the specific user that are members of a different social network than the user of user account 608. The extra-network connections 618 is a memory location for storing information about the connections between the user of user account 608 and other users that are members of social networks that are different than the social network having the user account 608. Central repository 620 stores a lists of aliases of users. Each alias is an address at a social network or another service. In other words, a user may enter each of the user's usernames for a number of different social networks and/or other services. Then, when a user receives a message at the repository, a message is sent to each alias. Central repository is discussed further in conjunction with FIG. 8B.

Protocol for Inter-Social Network Communications

Figure 7:
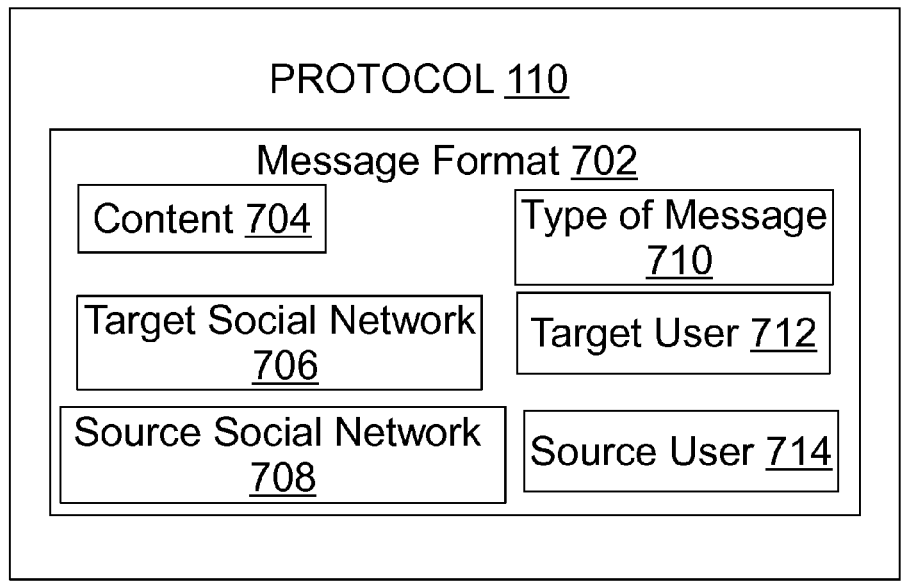
FIG. 7 illustrates a block diagram of an embodiment of a protocol for two social networks to communicate with one another.

FIG. 7 illustrates a block diagram of an embodiment of a protocol 110. Protocol 110 may include message format 702, including content 704, target social network 706, source social network 708, type of message 710, target user 712, and source user 714. In other embodiments, protocol 110 may not have all of the components listed and/or may have other elements instead of, or in addition to, those listed above.

FIG. 7 illustrates a block diagram of an embodiment of a protocol 110 that may be used in the inter-social-network protocols described herein. Protocol 110 is an embodiment of protocol 604 (FIG. 6). The protocol 110 is a standardized protocol that may be shared among social networks for sending messages between networks. Protocol 110 may include conventions agreed upon and used by the participating social networks. Protocol 110 may include a standardized message format that indicates a standardized way of arranging different types of messages, such as posts to walls, direct messages, instant messages, and/or requests to connect-to/friend other users. Standardized formats may also be established for how to package content, pictures, videos, music, oral messages, written messages, and any information that is included with the message (who sent it, what social network was it sent from, etc). The message conveyed, via protocol 110, need not be a written message, but may be any type of content that is sent between social networks. Optionally, protocol 110 may include a standardized Application Program Interface (API) that is shared by the social networks in the group of social networks that agree to accept inter-social-network communications with one another.

Protocol 110 allows messages, which might ordinarily be of a type that are only shared or sent within a social network between users of the same social network, to be sent from one social network to another and between users of different social networks.

The message format 702 is the format that is agreed to for sending messages in protocol 110. Message format 702 may include a place for indicating the target social network (e.g., the network that the message is being sent to), source social network, target user, source user, and content. Messages sent in message format 702 may be packetized to send across a network, they may include files and/or links to files, and/or may be encrypted or otherwise secured before being sent.

Content 704 is the content of the message. Content 704 may not necessarily have a particular format (e.g., it is free text), may include links to or copies of files, and may not necessarily be in the same format as the information about the type of message, sender and receiver of the messages. Content 704 may be the content of an inter-social network direct message, a post on a wall, a message accompanying a friend request, a message accompanying a follow request, or the content of an instant message, depending on the type of message being sent.

The target social network 706 is the social network to which the message is being sent. The target social network 706 may be a social network that has agreed to be involved in the cooperation protocol and may be a member of a group of social networks that agree to allow users to send inter-social network messages and exchange other information as well.

The source social network 708 is the social network from which the message is being sent. The source social network 708 is the social network that the message is coming from or the network that the source user is using when the message is sent. The source social network 708 agrees to be involved in the inter-social-network protocol and implements the protocol 110.

The type of message 710 is an indication of the type of message being sent. For example, type of message 710 may be an indication that the message is an inter-social network direct message, inter-social network instant message, an inter-social network post on a wall, an inter social network request for the sender to follow the recipient, an inter-social network request by the sender to friend the recipient. As an example, the indication may be an arbitrary alpha numerical designation (e.g., 1 may represent a wall post, 2 may represent a friend request) or may be a text label. As another example, "wall" or "wall post" may indicate that the message is a wall post, and "e-mail" may represent an inter-social network e-mail message, etc.

Target user 712 is the user that is the intended recipient of the message (i.e., the user to whom the message is sent). The target user 712 may be a member of the target social network.

The source user 714 is the user that is sending the message. The source user 714 belongs to the source social network indicated in source network 710 and may use the source social network to send a message to a target user 714 in a separate network. For example, the source user 714 may be logged onto "Chatter" (the source social network) and may send a message to a target user that is logged onto "Facebook" (the target social network).

In one implementation, a user may need to complete a basic registration process or follow a single-sign on process in order to access a different social network.

Block Diagram of Algorithm for Implementing Protocol

Figure 8A:
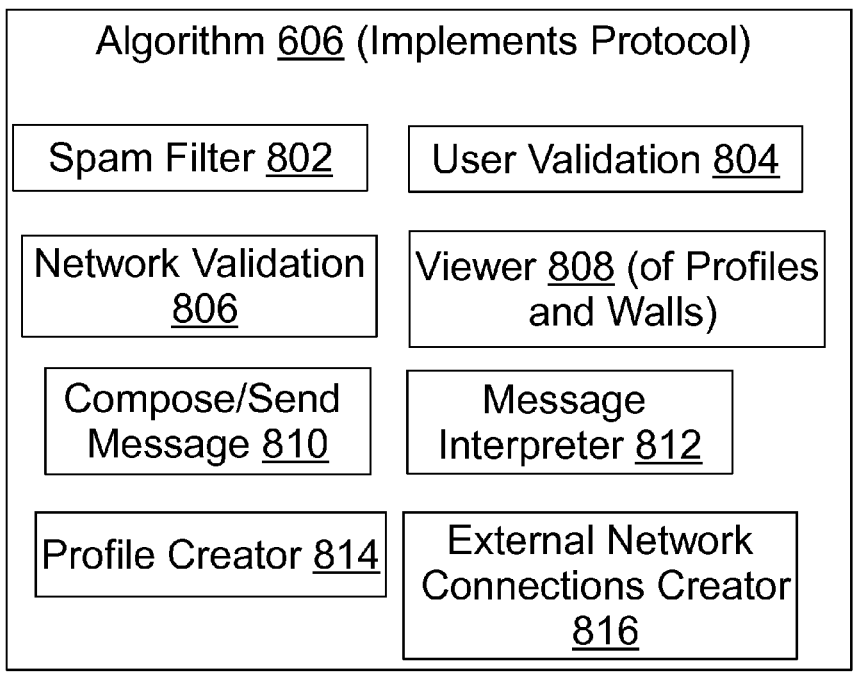
FIG. 8A illustrates a block diagram of an embodiment of an algorithm for implementing the protocol of FIG. 7.

FIG. 8A illustrates a block diagram of an embodiment of an algorithm 606, which is for implementing the protocol of FIG. 7. Algorithm for implementing the protocol of FIG. 7 may include spam filter 802, user validation 804, network validation 806, viewer 808, compose/send message 810, message interpreter 812, profile creator 814, and external network connections creator 816. In other embodiments, algorithm 606 may not have all of the components listed and/or may have other elements instead of, or in addition to, those listed above.

The algorithm 606 includes the steps necessary to implement the agreed to protocol. FIG. 8 illustrates a block diagram of an embodiment of algorithm 606 that might be used in the inter-social-network protocols described herein.

The algorithm 606 may include a spam filter to identify and filter out spam message.

The algorithm 606 includes the steps necessary to implement the agreed to protocol. FIG. 8 illustrates a block diagram of an embodiment of algorithm 606 that might be used in the inter-social-network protocols described herein. The algorithm 606 may include a spam filter to identify and filter out spam messages.

The algorithm 606 may include a user validation that identifies the user, checks to see if the user is a member of the social network and, if the user is a member, allows the message to be sent. The user validation may block a message or a user if either is determined not to be authentic or if the source network system is determined not to be a member of the group of social network that agreed to allow inter-social network communications.

Spam filter 802 is an algorithm that identifies messages that are suspected to be unwanted by the user. User validation 804 checks whether the user is a valid user that is a member of the social network indicated as the target social network.

Network validation 806 checks whether the social network is a valid social network, such as whether the social network is a member of a group of social networks that agree to accept inter-social-network communications from one another. In one implementation, for security purposes, the social network field is hashed or encrypted to avoid spoofing. Network validation 806 may identify whether the network is a part of the circle of social networks signed up for the protocol—that have agreed to the protocol. The network validation 806 may respond by blocking an inter-social-network communication. Alternatively, spam filter 802 may block the communication, based at least in part on results of user validation 804 and network validation 806.

Viewer 808 may allow the user to view another user's profiles and/or walls despite the user whose profile and/or wall is being viewed is a member of a different social network than the user viewing the profile and/or the wall.

Compose/send message 810 may allow a user on one social network to compose a message and send the message to a user on another social network, via the two social networks. Compose/send message 810 may take information from a message that is formatted for one social network and place the information into the agreed upon format (as determined by protocol 110), so that the message may be sent to another social network. Compose/send message 810 may allow a user to compose/send messages from any social network (that agrees to allow inter-social network communications) that may be read by any social network (that agrees to allow inter-social network communications).

Message interpreter 812 may interpret messages from other social networks. Message interpreter 812 may take information received at one social network from another social network that is in the format of protocol 110. The information retrieved from the format of the protocol 110, via message interpreter 812, may be placed into a format that messages are sent, stored, viewed within the social network that received the message.

Profile creator 814 may create a profile in the present social network for a user associated with another social network. External network connections creator 816 may establish connections to someone in another social network.

Central Repository

Figure 8B:
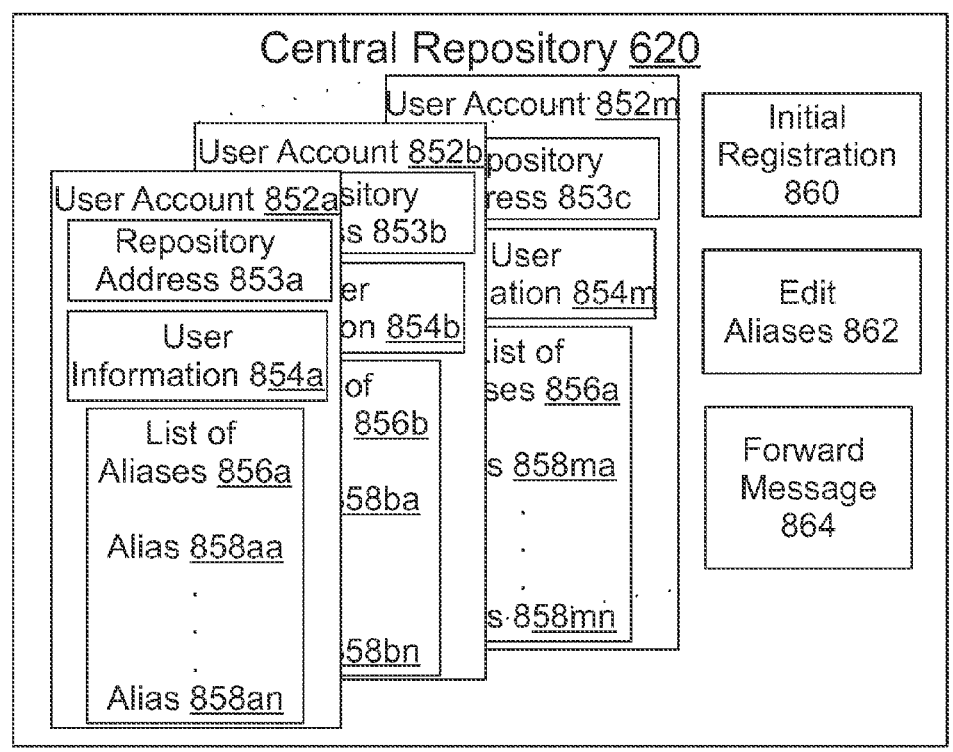
FIG. 8B shows a block diagram of an embodiment of central repository for storing aliases of a user and forwarding messages for the user to each of the aliases.

FIG. 8B shows a block diagram of an embodiment of central repository 620. Central repository 620 includes user accounts 852a-852m, user information 854a-m, list of aliases 856a-m, aliases 858aa-mn, initial registration 860, edits aliases 862, and forward messages 864. In other embodiments, central repository 620 may not have all of the components listed and/or may have other elements instead of, or in addition to, those listed above.

User accounts 852a-852m, are a collection of user accounts including each user that registers with the repository. Repository addresses 853a-853m are the addresses at the repository of the users associated with user accounts 852a-m. Someone that wants to send a message to a particular user, sends the message to the repository address of the user, and the repository forwards the message to each alias of the user. User information 854a-m is information about each of the users associated with user accounts 852a-m, respectively, needed for setting up the account. Lists of aliases 856a-m are the lists of the aliases associated with the users of each of the user accounts 852a-m, respectively, Aliases 858aa-mn are the aliases of the users of user accounts 852a-m. Specifically, aliases 858aa-an are the aliases of the user associated with user account 852a, aliases 858ba-bn are the aliases of the user of user account 852b, and aliases 858ma-mn are the aliases of the user of user account 852m (despite the usage of the letter n to represent the number of aliases of each user, each user may have a different number of aliases). When a message is received at the repository address of the user, repository 620 forwards the message to each alias of the user.

Initial registration 860, edits aliases 862, and forward messages 864 are algorithms or routines that are associated with central repository 620 (which may run on the machine of a social network). Initial registration 860, when implemented by the user, registers the user with central repository 620, and may set up an initial list of aliases for the user. Edit aliases 862, when implemented by the user, edits the list of aliases of the user. Edit aliases 862 may be used to add, remove of change one or more aliases. Forward messages 864 forwards messages received to each of the aliases of the user. When a message is received at the repository address of the user, forward messages 864 forwards the message to each alias of the user.

Social Network System

Figure 9:
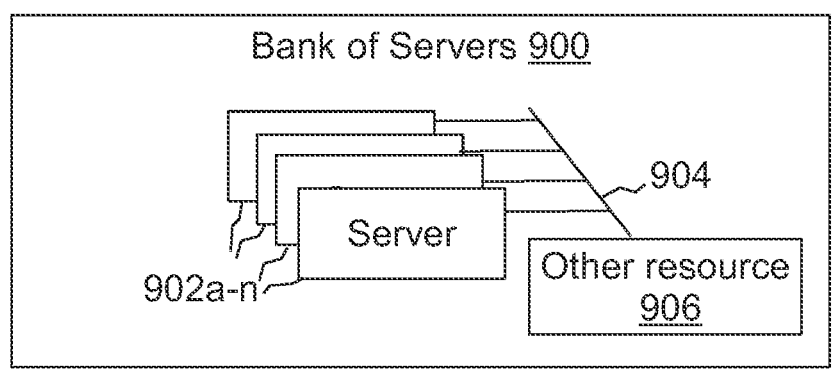
FIG. 9 illustrates a block diagram of an embodiment of a bank of servers for a social network.

FIG. 9 illustrates a block diagram of an embodiment of a bank of servers 900 for a social network system. Bank of servers 900 may include servers 902a-n, communications bus 904, and other resources 906. In other embodiments, bank of servers 900 may not have all of the components listed and/or may have other elements instead of, or in addition to, those listed above.

FIG. 9 illustrates a block diagram of an embodiment of a bank of servers 900 that may be used in a social network system, such as social network system 103 or 105 illustrated in FIG. 1. Bank of servers 900 may include as many servers as is necessary for implementing and carrying out all of the methods and systems described herein. The bank of servers 900 may be used from any social network that has agreed to be a part of the social network cooperation protocol. In other words, the servers may be located at each social network or may be located at a separate server dedicated to handling message exchanges using the social network cooperation protocol. Servers 902a-n may be an embodiment of social network system 103 (having server systems 104a-n) or social network system 105 (having server systems 106a-n). Servers 902a-n receive messages from, and send messages to, users systems of users that are members of the social network associated with bank of servers 900, allowing the users to participate in the social network. Servers 900a-n may also send messages to other social networks. Communications bus 904 communicatively connects servers 900a-n to one another. Servers 902a-n may include social network memory 600 (which includes protocol 110 and algorithm 606, for example). Other resources 906 may include a central storage area and/or a database. Other resources 906 may include an on-demand multitenant database.

Server of Social Network System

Figure 10:
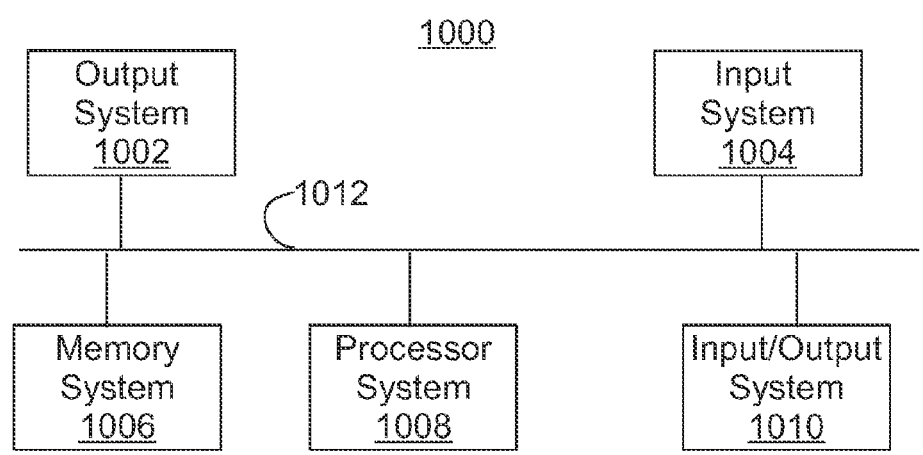
FIG. 10 illustrates a block diagram of an embodiment of a server of the bank of servers of FIG. 9.

FIG. 10 shows a block diagram of a server 1000 used in FIG. 9. The computer may include output system 1002, input system 1004, memory system 1006, processor system 1008, communications system 1012, and input/output device 1014. In other embodiments, Server 1000 may include additional components and/or may not include all of the components listed above.

Server 1000 is an example of a computer that may be used for any of servers 902a-n.

Output system 1002 may include any one of, some of, any combination of, or all of a monitor system, a handheld display system, a printer system, a speaker system, a connection or interface system to a sound system, an interface system to peripheral devices and/or a connection and/or interface system to a computer system, intranet, and/or internet, for example.

Input system 1004 may include any one of, some of, any combination of, or all of a keyboard system, a mouse system, a track ball system, a track pad system, buttons on a handheld system, a scanner system, a microphone system, a connection to a sound system, and/or a connection and/or interface system to a computer system, intranet, and/or internet (e.g., IrDA, USB), for example.

Memory system 1006 may include, for example, any one of, some of, any combination of, or all of a long term storage system, such as a hard drive; a short term storage system, such as random access memory; a removable storage system, such as a floppy drive or a removable drive; and/or flash memory. Memory system 1006 may include one or more machine-readable mediums that may store a variety of different types of information. The term machine-readable medium is used to refer to any non-transient medium capable carrying information that is readable by a machine. One example of a machine-readable medium is a non-transient computer-readable medium. Another example of a machine-readable medium is paper having holes that are detected that trigger different mechanical, electrical, and/or logic responses. Memory system 1006 may store software and/or templates for performing tasks related to social networks. For example, memory system 1006 may store an intra-social network email application. A storage areas for storing information related to individual accounts, such as a list friends or connections. Memory system 1006 may include software for handling communications related to walls, such as for posting messages on walls, checking if a wall is public, etc. Memory system 1006 may include social network memory 600, which may store protocol 604 or 110 algorithm 606, and the social network features of FIG. 7, for example. Memory 1006 may store computer instructions for implementing a web server, a database server, and/or the methods of FIGS. 3A-4C.

Processor system 1008 may include any one of, some of, any combination of, or all of multiple parallel processors, a single processor, a system of processors having one or more central processors and/or one or more specialized processors dedicated to specific tasks. Processor system 1008 carries out the machine instructions stored in memory system 1006.

Communications system 1012 communicatively links output system 1002, input system 1004, memory system 1006, processor system 1008, and/or input/output system 1014 to each other. Communications system 1012 may include any one of, some of, any combination of, or all of electrical cables, fiber optic cables, and/or means of sending signals through air or water (e.g. wireless communications), or the like. Some examples of means of sending signals through air and/or water include systems for transmitting electromagnetic waves such as infrared and/or radio waves and/or systems for sending sound waves.

Input/output system 1014 may include devices that have the dual function as input and output devices. For example, input/output system 1014 may include one or more may include one or more ports that are used as both sending and receiving signals. Input/output system 1014 is optional, and may be used in addition to or in place of output system 1002 and/or input device 1004.

System Overview

Figure 11:
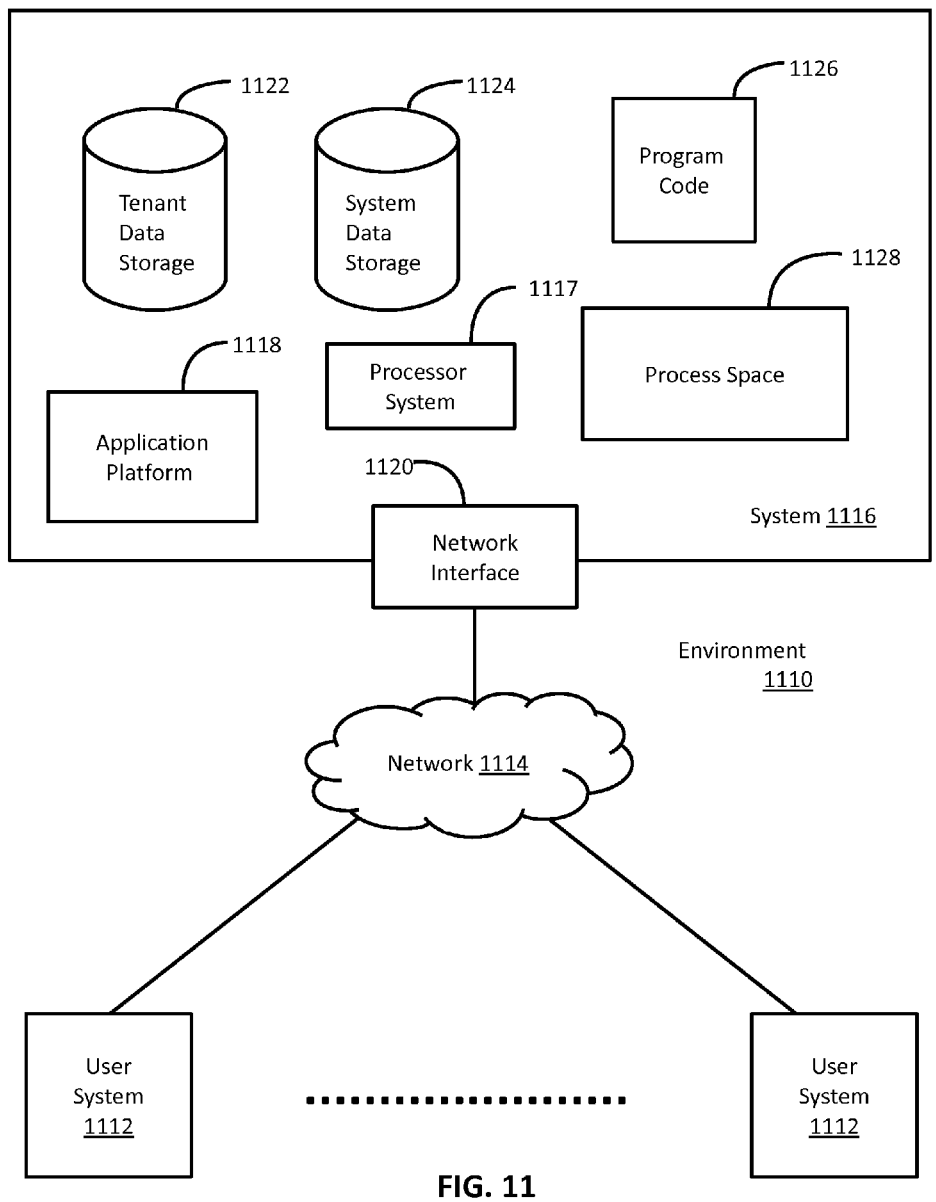
FIG. 11 illustrates a block diagram of an example of a system in which an on-demand database service may be used.

FIG. 11 illustrates a block diagram of an environment 1110 wherein an on-demand database service might be used. Environment 1110 may include user systems 1112, network 1114, system 1116, processor system 1117, application platform 1118, network interface 1120, tenant data storage 1122, system data storage 1124, program code 1126, and process space 1128. In other embodiments, environment 1110 may not have all of the components listed and/or may have other elements instead of, or in addition to, those listed above.

Environment 1110 is an environment in which an on-demand database service exists. User system 1112 may be any machine or system that is used by a user to access a database user system. For example, any of user systems 1112 can be a handheld computing device, a mobile phone, a laptop computer, a work station, and/or a network of computing devices. As illustrated in FIG. 11 (and in more detail in FIG. 12) user systems 1112 might interact via a network 1114 with an on-demand database service, which is system 1116.

An on-demand database service, such as system 1116, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 1116" and "system 1116" will be used interchangeably herein. A database image may include one or more database objects. A relational database management system (RDMS) or the equivalent may execute storage and retrieval of information against the database object(s). Application platform 1118 may be a framework that allows the applications of system 1116 to run, such as the hardware and/or software, e.g., the operating system. In an embodiment, on-demand database service 1116 may include an application platform 1118 that enables creation, managing and executing one or more applications developed by the provider of the on-demand database service, users accessing the on-demand database service via user systems 1112, or third party application developers accessing the on-demand database service via user systems 1112.

The users of user systems 1112 may differ in their respective capacities, and the capacity of a particular user system 1112 might be entirely determined by permissions (permission levels) for the current user. For example, where a salesperson is using a particular user system 1112 to interact with system 1116, that user system has the capacities allotted to that salesperson. However, while an administrator is using that user system to interact with system 1116, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 1114 is any network or combination of networks of devices that communicate with one another. For example, network 1114 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 1112 might communicate with system 1116 using TCP/IP and, at a higher network level, use other common Internet protocols to communicate, such as HTTP, FTP, AFS, WAP, etc. In an example where HTTP is used, user system 1112 might include an HTTP client commonly referred to as a "browser" for sending and receiving HTTP messages to and from an HTTP server at system 1116. Such an HTTP server might be implemented as the sole network interface between system 1116 and network 1114, but other techniques might be used as well or instead. In some implementations, the interface between system 1116 and network 1114 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 1116, shown in FIG. 11, implements a web-based customer relationship management (CRM) system. For example, in one embodiment, system 1116 includes application servers configured to implement and execute CRM software applications as well as provide related data, code, forms, webpages and other information to and from user systems 1112 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In at least one embodiment, system 1116 implements applications other than, or in addition to, a CRM application. For example, system 1116 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 1116.

One arrangement for elements of system 1116 is shown in FIG. 11, including a network interface 1120, application platform 1118, tenant data storage 1122 for tenant data 1223, system data storage 1124 for system data 1225 accessible to system 1116 and possibly multiple tenants, program code 1126 for implementing various functions of system 1116, and a process space 1128 for executing MTS system processes and tenant-specific processes, such as running applications as part of an application hosting service. Additional processes that may execute on system 1116 include database indexing processes.

Several elements in the system shown in FIG. 11 include conventional, well-known elements that are explained only briefly here. For example, each user system 1112 could include a desktop personal computer, workstation, laptop, PDA, cell phone, or any wireless access protocol (WAP) enabled device or any other computing device capable of interfacing directly or indirectly to the Internet or other network connection. User system 1112 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 1112 to access, process and view information, pages and applications available to it from system 1116 over network 1114. Each user system 1112 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 1116 or other systems or servers. For example, the user interface device can be used to access data and applications hosted by system 1116, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 1112 and all of its components are operator configurable using applications, such as a browser, including computer code run using a central processing unit such as an Intel Pentium® processor or the like. Similarly, system 1116 (and additional instances of an MTS, where more than one is present) and all of their components might be operator configurable using application(s) including computer code to run using a central processing unit such as processor system 1117, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 1116 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 1116 is configured to provide webpages, forms, applications, data and media content to user (client) systems 1112 to support the access by user systems 1112 as tenants of system 1116. As such, system 1116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 12:
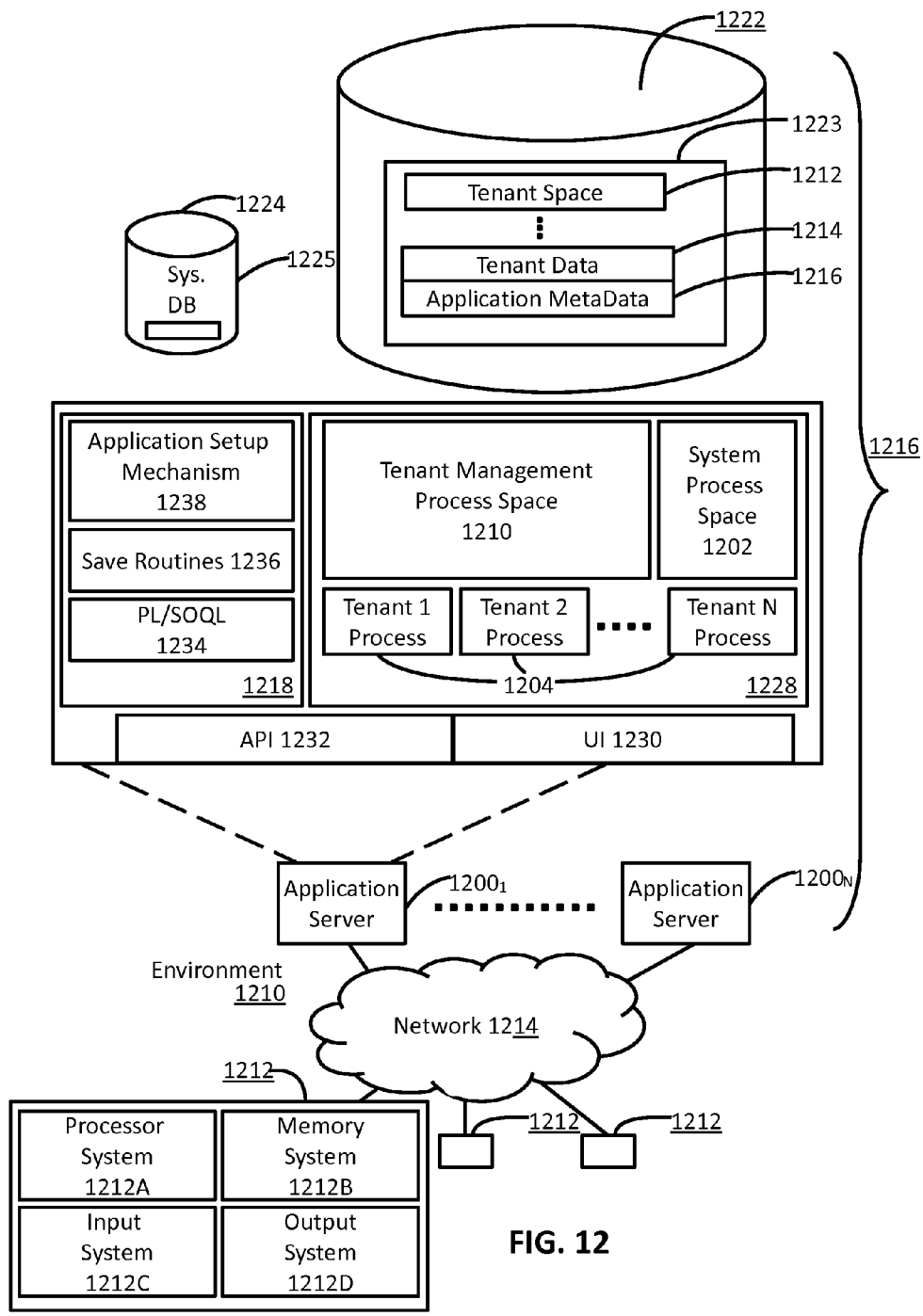
FIG. 12 illustrates an embodiment of the environment of FIG. 11 showing various further details of the environment.

FIG. 12 also illustrates environment 1110. However, in FIG. 12 elements of system 1116 and various interconnections in an embodiment are further illustrated. FIG. 12 shows that user system 1112 may include processor system 1112A, memory system 1112B, input system 1112C, and output system 1112D. FIG. 11 shows network 1114 and system 1116. FIG. 12 also shows that system 1116 may include tenant data storage 1122, tenant data 1223, system data storage 1124, system data 1225, User Interface (UI) 1230, Application Program Interface (API) 1232, PL/SOQL 1234, save routines 1236, application setup mechanism 1238, applications servers 1200₁-1200ₙ, system process space 1102, tenant process spaces 1104, tenant management process space 1110, tenant storage area 1112, user storage 1114, and application metadata 1116. In other embodiments, environment 1110 may not have the same elements as those listed above and/or may have other elements instead of, or in addition to, those listed above.

User system 1112, network 1114, system 1116, tenant data storage 1122, and system data storage 1124 were discussed above in FIG. 11. Regarding user system 1112, processor system 1112A may be any combination of one or more processors. Memory system 1112B may be any combination of one or more memory devices, short term, and/or long term memory. Input system 1112C may be any combination of input devices, such as one or more keyboards, mice, trackballs, scanners, cameras, and/or interfaces to networks. Output system 1112D may be any combination of output devices, such as one or more monitors, printers, and/or interfaces to networks. As shown by FIG. 11, system 1116 may include a network interface 1120 (of FIG. 11) implemented as a set of HTTP application servers 1200, an application platform 1118, tenant data storage 1122, and system data storage 1124. Also shown is system process space 1102, including individual tenant process spaces 1104 and a tenant management process space 1110. Each application server 1200 may be configured to tenant data storage 1122 and the tenant data 1223 therein, and system data storage 1124 and the system data 1225 therein to serve requests of user systems 1112. The tenant data 1223 might be divided into individual tenant storage areas 1112, which can be either a physical arrangement and/or a logical arrangement of data. Within each tenant storage area 1112, user storage 1114 and application metadata 1116 might be similarly allocated for each user. For example, a copy of a user's most recently used (MRU) items might be stored to user storage 1114. Similarly, a copy of MRU items for an entire organization that is a tenant might be stored to tenant storage area 1112. A UI 1230 provides a user interface and an API 1232 provides an application programmer interface to system 1116 resident processes to users and/or developers at user systems 1112. The tenant data and the system data may be stored in various databases, such as one or more Oracle™ databases.

Application platform 1118 includes an application setup mechanism 1238 that supports application developers' creation and management of applications, which may be saved as metadata into tenant data storage 1122 by save routines 1236 for execution by subscribers as one or more tenant process spaces 1104 managed by tenant management process 1110 for example. Invocations to such applications may be coded using PL/SOQL 1234 that provides a programming language style interface extension to API 1232. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 1116 for the subscriber making the invocation and executing the metadata as an application in a virtual machine.

Each application server 1200 may be communicably coupled to database systems, e.g., having access to system data 1225 and tenant data 1223, via a different network connection. For example, one application server 1200₁ might be coupled via the network 1114 (e.g., the Internet), another application server 1200ₙ₋₁ might be coupled via a direct network link, and another application server 1200ₙ might be coupled by yet a different network connection. Transfer Control Protocol and Internet Protocol (TCP/IP) are typical protocols for communicating between application servers 1200 and the database system. However, it will be apparent to one skilled in the art that other transport protocols may be used to optimize the system depending on the network interconnect used.

In at least one embodiment, each application server 1200 is configured to handle requests for any user associated with any organization that is a tenant. Because it is desirable to be able to add and remove application servers from the server pool at any time for any reason, there is preferably no server affinity for a user and/or organization to a specific application server 1200. In one embodiment, therefore, an interface system implementing a load balancing function (e.g., an F5 Big-IP load balancer) is communicably coupled between the application servers 1200 and the user systems 1112 to distribute requests to the application servers 1200. In one embodiment, the load balancer uses a least connections algorithm to route user requests to the application servers 1200. Other examples of load balancing algorithms, such as round robin and observed response time, also can be used. For example, in at least one embodiment, three consecutive requests from the same user could hit three different application servers 1200, and three requests from different users could hit the same application server 1200. In this manner, system 1116 is multi-tenant, wherein system 1116 handles storage of, and access to, different objects, data and applications across disparate users and organizations.

As an example of storage, one tenant might be a company that employs a sales force where each salesperson uses system 1116 to manage their sales process. Thus, a user might maintain contact data, leads data, customer follow-up data, performance data, goals and progress data, etc., all applicable to that user's personal sales process (e.g., in tenant data storage 1122). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 1116 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 1116 might also maintain system level data usable by multiple tenants or other data. Such system level data might include industry reports, news, postings, and the like that are sharable among tenants.

In at least one embodiment, user systems 1112 (which may be client systems) communicate with application servers 1200 to request and update system-level and tenant-level data from system 1116 that may require sending one or more queries to tenant data storage 1122 and/or system data storage 1124. System 1116 (e.g., an application server 1200 in system 1116) automatically generates one or more SQL statements (e.g., one or more SQL queries) that are designed to access the desired information. System data storage 1124 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or tenants may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In at least one embodiment, for example, all custom entity data rows are stored in a single multi-tenant physical table, which may contain multiple logical tables per organization. It may be transparent to customers that their multiple "tables" are in fact stored in one large table or that their data may be stored in the same table as the data of other customers.

Method for Using the Environment (FIGS. 11 and 12)

Figure 13:
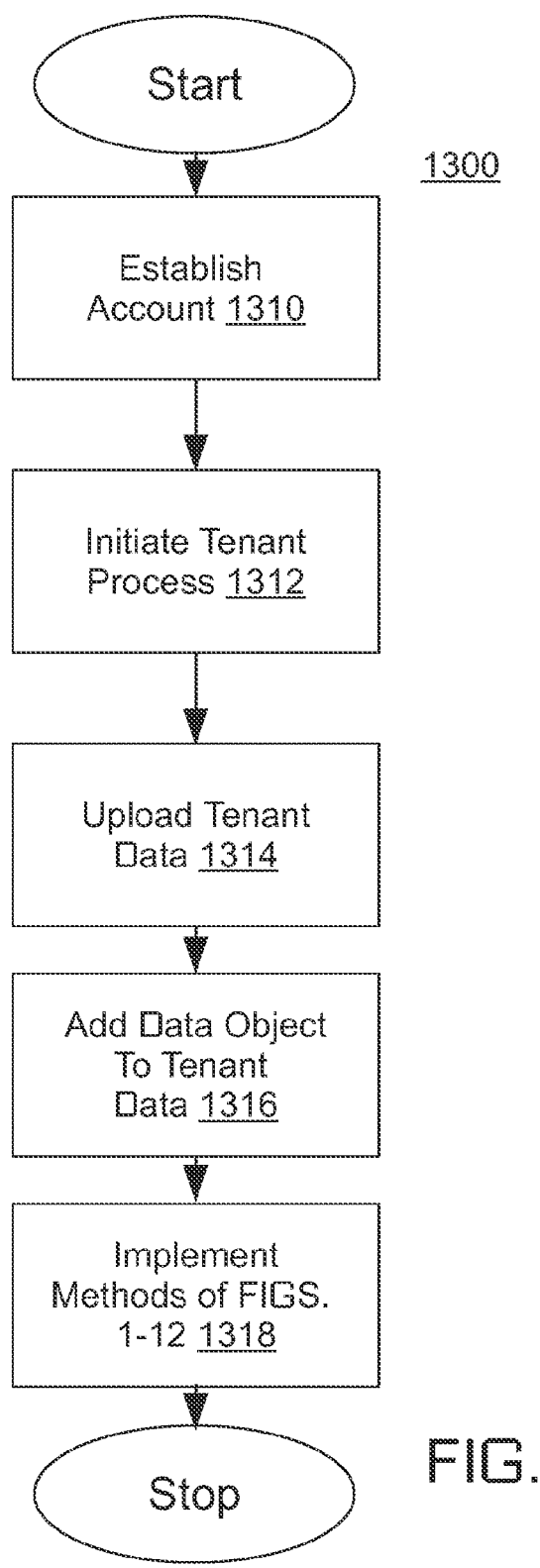
FIG. 13 illustrates a flow diagram of an example of a method of using the environment of FIG. 11.

FIG. 13 shows a flowchart of an example of a method 1300 of using environment 1110. In step 1310, user system 1112 (FIGS. 11 and 12) establishes an account. In step 1312, one or more tenant process space 1204 (FIG. 12) are initiated on behalf of user system 1112, which may also involve setting aside space in tenant space 1212 (FIG. 12) and tenant data 1214 (FIG. 12) for user system 1112. Step 1312 may also involve modifying application metadata to accommodate user system 1112. In step 1314, user system 1112 uploads data. In step 1316, one or more data objects are added to tenant data 1214 where the data uploaded is stored. In step 1318, the methods associated with FIGS. 1-12 may be implemented. In another embodiment, although depicted as distinct steps in FIG. 13, steps 1310-1318 may not be distinct steps. In other embodiments, method 1300 may not have all of the above steps and/or may have other steps in addition to, or instead of, those listed above. The steps of method 1300 may be performed in another order. Subsets of the steps listed above as part of method 1300 may be used to form their own method.

Method for Creating the Environment (FIGS. 11 and 12)

Figure 14:
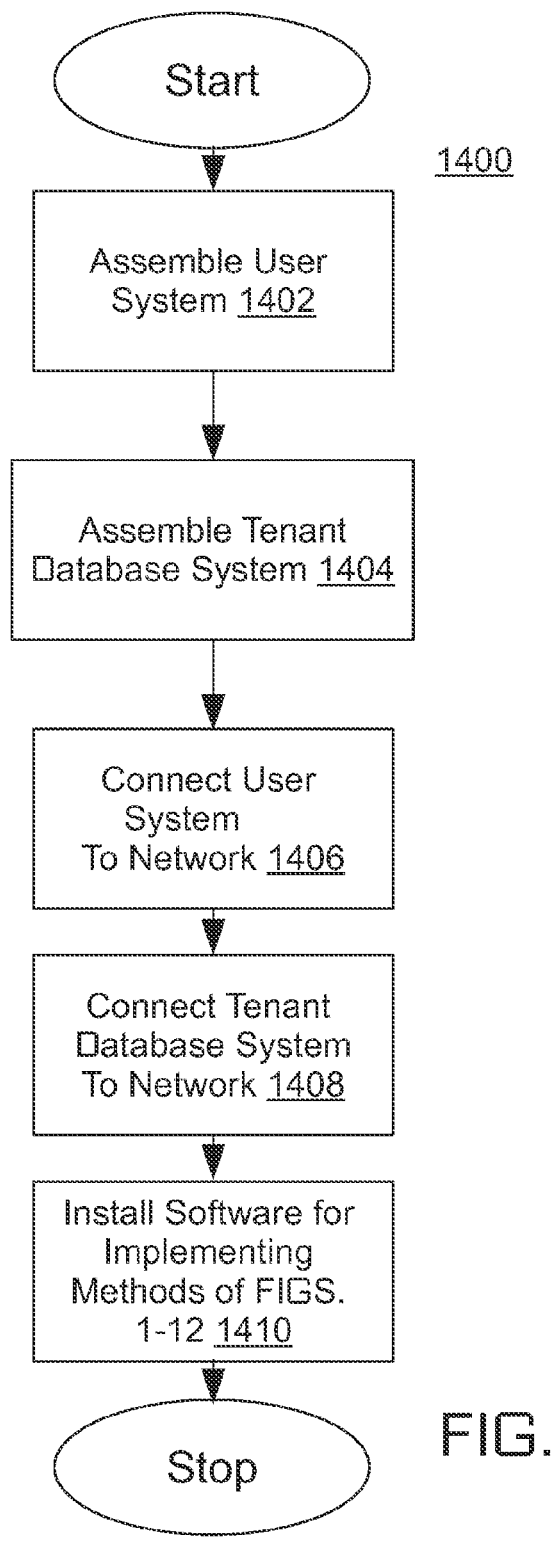
FIG. 14 illustrates a flow diagram of a method of making the environment of FIG. 11.

FIG. 14 is a method of making environment 1110, in step 1402, user system 1112 (FIGS. 11 and 12) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another.

In step 1404, system 1116 (FIGS. 11 and 12) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another. Additionally assembling system 1116 may include installing application platform 1118, network interface 1120, tenant data storage 1122, system data storage 1124, system data 1225, program code 1126, process space 1128, UI 1230, API 1232, PL/SOQL 1234, save routine 1236, application setup mechanism 1238, applications servers 100₁-100ₙ, system process space 102, tenant process spaces 1204, tenant management process space 110, tenant space 1212, tenant data 1214, and application metadata 116 (FIG. 12).

In step 1406, user system 1112 is communicatively coupled to network 1204. In step 1408, system 1116 is communicatively coupled to network 1204 allowing user system 1112 and system 1116 to communicate with one another (FIG. 12). In step 1410, one or more instructions may be installed in system 1116 (e.g., the instructions may be installed on one or more machine readable media, such as computer readable media, therein) and/or system 1116 is otherwise configured for performing the steps of methods associated with FIGS. 1-12. In an embodiment, each of the steps of method 1400 is a distinct step. In another embodiment, although depicted as distinct steps in FIG. 14, steps 1402-1410 may not be distinct steps. In other embodiments, method 1400 may not have all of the above steps and/or may have other steps in addition to, or instead of, those listed above. The steps of method 1400 may be performed in another order. Subsets of the steps listed above as part of method 1400 may be used to form their own method.

Extensions and Alternatives

Each embodiment disclosed herein may be used or otherwise combined with any of the other embodiments disclosed. Any element of any embodiment may be used in any embodiment.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method comprising:
    enabling, at a first social network platform implemented using the database system, communications channels between the first social network platform and a plurality of social network platforms external to the first social network platform, the communications channels permitting communications according to a protocol between the first social network platform and the external social network platforms, the communications comprising application programming interface (API) requests from the first social network platform to the external social network platforms, each social network platform being maintained on behalf of a respective social network provider;
    retrieving, by the first social network platform, by sending a plurality of first API requests to the external social network platforms, a plurality of social media messages from the external social network platforms, the social media messages capable of being stored as data objects in at least one database of the database system;
    providing, by the first social network platform, the social media messages to a user device associated with a user of the first social network platform, the social media messages configured to be processed by the user device to present the social media messages in a message stream of a user interface displayable on a display of the user device;
    receiving, at the first social network platform, an indication from the user device of first user input selecting a first one of the social media messages;
    identifying, by the first social network platform, one of the external social network platforms from which the first social media message was retrieved;
    determining, by the first social network platform, a plurality of message actions according to the identified external social network platform, the determined message actions being social media-related actions provided by the identified external social network platform;
    providing, by the first social network platform, information identifying the determined message actions to the user device, the information configured to be processed by the user device to present the determined message actions in an actionable menu of the user interface;
    receiving, at the first social network platform, an indication from the user device of second user input selecting at least one of the determined message actions; and
    requesting, by the first social network platform, by sending at least one second API request to the identified social network platform, performance of the selected at least one message action.

2. The method of claim 1, wherein the selected at least one message action is one of: a view post, a wall post, a reply to the selected first social media message, an archive action, a hide action, a direct message, a reply with comment, an add label action, a favorite action, or a follow request.

3. The method of claim 1, wherein the selected first social media message configured to be processed by the user device to present the selected first social media message as a pop-up window overlaying the message stream, the pop-up window comprising a thread of previous social media messages associated with the selected first social media messages.

4. The method of claim 1, the method further comprising:
    receiving, at the first social network platform, an indication from the user device of third user input selecting a second determined message action, the selected second message action being a different message action than the selected at least one message action; and
    requesting, by the first social network platform, by sending at least one second API request to the identified external social network platform, performance of the selected second message action.

5. The method of claim 1, wherein the plurality of social media messages are assigned to one or more users of the first social network platform, wherein the first social media message is assigned to the user of the first social network platform.

6. The method of claim 1, the method further comprising:
    receiving, at the first social network platform, an indication from the user device of a request to assign the first social media message to a second user;
    determining, by the first social network platform, that the second user has access to the identified external social network, the determination based on the second user having at least one shared communication channel as the user; and
    assigning, by the first social network platform, the first social media message to the second user.

7. A database system configurable to:
    enable, at a first social network platform implemented using the database system, communications channels between the first social network platform and a plurality of social network platforms external to the first social network platform, the communications channels permitting communications according to a protocol between the first social network platform and the external social network platforms, the communications comprising application programming interface (API) requests from the first social network platform to the external social network platforms, each social network platform being maintained on behalf of a respective social network provider;

retrieve, by the first social network platform, by sending a plurality of first API requests to the external social network platforms, a plurality of social media messages from the external social network platforms, the social media messages capable of being stored as data objects in at least one database of the database system;

provide, by the first social network platform, the social media messages to a user device associated with a user of the first social network platform, the social media messages configured to be processed by the user device to present the social media messages in a message stream of a user interface displayable on a display of the user device;

receive, at the first social network platform, an indication from the user device of first user input selecting a first one of the social media messages;

identify, by the first social network platform, one of the external social network platforms from which the first social media message was retrieved;

determine, by the first social network platform, a plurality of message actions according to the identified external social network platform, the determined message actions being social media-related actions provided by the identified external social network platform;

provide, by the first social network platform, information identifying the determined message actions to the user device, the information configured to be processed by the user device to present the determined message actions in an actionable menu of the user interface;

receive, at the first social network platform, an indication from the user device of second user input selecting at least one of the determined message actions; and request, by the first social network platform, by sending at least one second API request to the identified external social network platform, performance of the selected at least one message action.

8. The database system of claim 7, wherein the selected at least one message action is one of: a view post, a wall post, a reply to the selected first social media message, an archive action, a hide action, a direct message, a reply with comment, an add label action, a favorite action, or a follow request.

9. The database system of claim 7, wherein the selected first social media message configured to be processed by the user device to present the selected first social media message as a pop-up window overlaying the message stream, the pop-up window comprising a thread of previous social media messages associated with the selected first social media messages.

10. The database system of claim 7, the database further configurable to:
receive, at the first social network platform, an indication from the user device of third user input selecting a second determined message action, the selected second message action being a different message action than the selected at least one message action; and
request, by the first social network platform, by sending at least one second API request to the identified external social network platform, performance of the selected second message action.

11. The database system of claim 7, wherein the plurality of social media messages are assigned to one or more users of the first social network platform, wherein the first social media message is assigned to the user of the first social network platform.

12. The database system of claim 7, the database further configured to:
receive, at the first social network platform, an indication from the user device of a request to assign the first social media message to a second user;
determine, by the first social network platform, that the second user has access to the identified external social network, the determination based on the second user having at least one shared communication channel as the user; and
assign, by the first social network platform, the first social media message to the second user.

13. A computer program product comprising program code to be executed by at least one processor when retrieved from a non-transitory computer-readable storage medium the program code comprising instructions configured to cause:
enabling, at a first social network platform implemented using a database system, communications channels between the first social network platform and a plurality of social network platforms external to the first social network platform, the communications channels permitting communications according to a protocol between the first social network platform and the external social network platforms, the communications comprising application programming interface (API) requests from the first social network platform to the external social network platforms, each social network platform being maintained on behalf of a respective social network provider;

retrieving, by the first social network platform, by sending a plurality of first API requests to the external social network platforms, a plurality of social media messages from the external social network platforms, the social media messages capable of being stored as data objects in at least one database of the database system;

providing, by the first social network platform, the social media messages to a user device associated with a user of the first social network platform, the social media messages configured to be processed by the user device to present the social media messages in a message stream of a user interface displayable on a display of the user device;

receiving, at the first social network platform, an indication from the user device of first user input selecting a first one of the social media messages;

identifying, by the first social network platform, one of the external social network platforms from which the first social media message was retrieved;

determining, by the first social network platform, a plurality of message actions according to the identified external social network platform, the determined message actions being social media-related actions provided by the identified external social network platform;

providing, by the first social network platform, information identifying the determined message actions to the user device, the information configured to be processed by the user device to present the determined message actions in an actionable menu of the user interface;

receiving, at the first social network platform, an indication from the user device of second user input selecting at least one of the determined message actions; and requesting, by the first social network platform, by sending at least one second API request to the identified external social network platform, performance of the selected at least one message action.

14. The computer program product of claim 13, wherein the selected at least one message action is one of: a view post, a wall post, a reply to the selected first social media message, an archive action, a hide action, a direct message, a reply with comment, an add label action, a favorite action, or a follow request.

15. The computer program product of claim 13, wherein the selected first social media message configured to be processed by the user device to present the selected first social media message as a pop-up window overlaying the message stream, the pop-up window comprising a thread of previous social media messages associated with the selected first social media messages.

16. The computer program product of claim 13, the method to be performed further comprising:
    receiving, at the first social network platform, an indication from the user device of third user input selecting a second determined message action, the selected second message action being a different message action than the selected at least one message action; and
    requesting, by the first social network platform, by sending at least one second API request to the identified external social network platform, performance of the selected second message action.

17. The computer program product of claim 13, wherein the plurality of social media messages are assigned to one or more users of the first social network platform, wherein the first social media message is assigned to the user of the first social network platform.

18. The computer program product of claim 13, the method to be performed further comprising:
    receiving, at the first social network platform, an indication from the user device of a request to assign the first social media message to a second user;
    determining, by the first social network platform, that the second user has access to the identified external social network, the determination based on the second user having at least one shared communication channel as the user; and
    assigning, by the first social network platform, the first social media message to the second user.

* * * * *